US006685303B1

(12) United States Patent
Trauernicht et al.

(10) Patent No.: US 6,685,303 B1
(45) Date of Patent: Feb. 3, 2004

(54) THERMAL ACTUATOR WITH REDUCED TEMPERATURE EXTREME AND METHOD OF OPERATING SAME

(75) Inventors: David P. Trauernicht, Rochester, NY (US); Edward P. Furlani, Lancaster, NY (US); John A. Lebens, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/218,788

(22) Filed: Aug. 14, 2002

(51) Int. Cl.[7] ........................ H01H 71/18; H01H 61/02; H01H 37/46; H01H 61/00; H01H 71/00; H01H 61/06; H02N 1/00; B05B 1/08; B05B 3/04; B41J 2/04; B41J 2/05

(52) U.S. Cl. ............................ 347/54; 347/56; 337/16; 337/139; 337/140; 337/141; 337/393; 60/528; 310/307; 239/102.1

(58) Field of Search ............. 347/54, 56; 310/306–329; 337/16, 36, 38, 107, 333, 339, 362, 379, 343, 393, 298; 60/527–529; 361/163; 239/102.1, 135; 222/504

(56) References Cited

U.S. PATENT DOCUMENTS 3,747,120 A 7/1973 Stemme
3,946,398 A 3/1976 Kyser et al.
4,296,421 A 10/1981 Hara et al.
5,599,695 A 2/1997 Pease et al.
5,771,882 A 6/1998 Psaros et al.
5,902,648 A 5/1999 Naka et al.
6,067,797 A 5/2000 Silverbrook
6,087,638 A 7/2000 Silverbrook
6,123,419 A 9/2000 Cleland
6,180,427 B1 1/2001 Silverbrook
6,239,821 B1 5/2001 Silverbrook
6,243,113 B1 6/2001 Silverbrook
6,254,793 B1 7/2001 Silverbrook
6,274,056 B1 8/2001 Silverbrook
6,280,019 B1 8/2001 Giere et al.
6,290,336 B1 9/2001 Cleland
6,309,052 B1 10/2001 Prasad et al.
6,483,419 B1 * 11/2002 Weaver et al. .............. 337/393

FOREIGN PATENT DOCUMENTS

JP 2030543 1/1990

* cited by examiner

*Primary Examiner*—Michael S Brooke
(74) *Attorney, Agent, or Firm*—William R. Zimmerli

(57) ABSTRACT

An apparatus for a thermal actuator for a micromechanical device, especially a liquid drop emitter such as an ink jet printhead, is disclosed. The disclosed thermal actuator comprises a base element and a cantilevered element extending from the base element and normally residing at a first position before activation. The cantilevered element includes a first layer constructed of an electrically resistive material, such as titanium aluminide, patterned to have a first resistor segment and a second resistor segment each extending from the base element; a coupling device that conducts electrical current serially between the first and second resistor segments; and a second layer constructed of a dielectric material having a low coefficient of thermal expansion and attached to the first layer. A first electrode connected to the first resistor segment and a second electrode connected to the second resistor segment are provided to apply an electrical voltage pulse between the first and second electrodes thereby causing an activation power density in the first and second resistor segments and a power density maximum within the coupling device resulting in a deflection of the cantilevered element to a second position and wherein the power density maximum is less than four times the activation power density. The coupling device may be formed as a segment in the first layer or in a third layer of an electrically active material. Methods of operating a liquid drop emitter having a thermal actuator are disclosed which avoid the generation of vapor bubbles.

26 Claims, 17 Drawing Sheets

THERMAL ACTUATOR WITH REDUCED TEMPERATURE EXTREME AND METHOD OF OPERATING SAME

FIELD OF THE INVENTION

The present invention relates generally to micro-electromechanical devices and, more particularly, to micro-electromechanical thermal actuators such as the type used in ink jet devices and other liquid drop emitters.

BACKGROUND OF THE INVENTION

Micro-electro mechanical systems (MEMS) are a relatively recent development. Such MEMS are being used as alternatives to conventional electro-mechanical devices as actuators, valves, and positioners. Micro-electromechanical devices are potentially low cost, due to use of microelectronic fabrication techniques. Novel applications are also being discovered due to the small size scale of MEMS devices.

Many potential applications of MEMS technology utilize thermal actuation to provide the motion needed in such devices. For example, many actuators, valves and positioners use thermal actuators for movement. In some applications the movement required is pulsed. For example, rapid displacement from a first position to a second, followed by restoration of the actuator to the first position, might be used to generate pressure pulses in a fluid or to advance a mechanism one unit of distance or rotation per actuation pulse. Drop-on-demand liquid drop emitters use discrete pressure pulses to eject discrete amounts of liquid from a nozzle.

Drop-on-demand (DOD) liquid emission devices have been known as ink printing devices in ink jet printing systems for many years. Early devices were based on piezoelectric actuators such as are disclosed by Kyser et al., in U.S. Pat. No. 3,946,398 and Stemme in U.S. Pat. No. 3,747,120. A currently popular form of ink jet printing, thermal ink jet (or “bubble jet”), uses electroresistive heaters to generate vapor bubbles which cause drop emission, as is discussed by Hara et al., in U.S. Pat. No. 4,296,421.

Electroresistive heater actuators have manufacturing cost advantages over piezoelectric actuators because they can be fabricated using well developed microelectronic processes. On the other hand, the thermal ink jet drop ejection mechanism requires the ink to have a vaporizable component, and locally raises ink temperatures well above the boiling point of this component. This temperature exposure places severe limits on the formulation of inks and other liquids that may be reliably emitted by thermal ink jet devices. Piezoelectrically actuated devices do not impose such severe limitations on the liquids that can be jetted because the liquid is mechanically pressurized.

The availability, cost, and technical performance improvements that have been realized by ink jet device suppliers have also engendered interest in the devices for other applications requiring micro-metering of liquids. These new applications include dispensing specialized chemicals for micro-analytic chemistry as disclosed by Pease et al., in U.S. Pat. No. 5,599,695; dispensing coating materials for electronic device manufacturing as disclosed by Naka et al., in U.S. Pat. No. 5,902,648; and for dispensing microdrops for medical inhalation therapy as disclosed by Psaros et al., in U.S. Pat. No. 5,771,882. Devices and methods capable of emitting, on demand, micron-sized drops of a broad range of liquids are needed for highest quality image printing, but also for emerging applications where liquid dispensing requires mono-dispersion of ultra small drops, accurate placement and timing, and minute increments.

A low cost approach to micro drop emission is needed which can be used with a broad range of liquid formulations. Apparatus and methods are needed which combines the advantages of microelectronic fabrication used for thermal ink jet with the liquid composition latitude available to piezo-electro-mechanical devices.

A DOD ink jet device which uses a thermo-mechanical actuator was disclosed by T. Kitahara in JP 2,030,543, filed Jul. 21, 1988. The actuator is configured as a bi-layer cantilever moveable within an ink jet chamber. The beam is heated by a resistor causing it to bend due to a mismatch in thermal expansion of the layers. The free end of the beam moves to pressurize the ink at the nozzle causing drop emission. Recently, disclosures of a similar thermo-mechanical DOD ink jet configuration have been made by K. Silverbrook in U.S. Pat. Nos. 6,067,797; 6,087,638; 6,239,821 and 6,243,113. Methods of manufacturing thermo-mechanical ink jet devices using microelectronic processes have been disclosed by K. Silverbrook in U.S. Pat. Nos. 6,180,427; 6,254,793 and 6,274,056.

Thermo-mechanically actuated drop emitters employing a cantilevered element are promising as low cost devices which can be mass produced using microelectronic materials and equipment and which allow operation with liquids that would be unreliable in a thermal ink jet device. However, the design and operation of cantilever style thermal actuators and drop emitters requires careful attention to locations of potentially excessive heat, “hot spots”, especially any within the cantilevered element which may be adjacent to the working liquid. When the cantilever is deflected by supplying electrical energy pulses to an on-board resistive heater, the pulse current is, most conveniently, directed on and off the moveable (deflectable) structure where the cantilever is anchored to a base element. Thus the current reverses direction at some locations on the cantilevered element. The locations of current directional change may be places of higher current density and power density, resulting in hot spots.

Hot spots are locations of several potential reliability problems, including loss of resistivity or catastrophic melting of resistive materials, electromigration of ions changing mechanical properties, delamination of adjacent layers, cracking and crazing of protective materials, and accelerated chemical interactions with components the working liquid. An additional potential problem for a thermo-mechanically activated drop emitter is the production of vapor bubbles in the working liquid immediately adjacent a hot spot. This latter phenomenon is purposefully employed in thermal ink jet devices to provide pressure pulses sufficient to eject ink drops. However, such vapor bubble formation is undesirable in a thermo-mechanically actuated drop emitter because it causes anomalous, erratic changes in drop emission timing, volume, and velocity. Also bubble formation may be accompanied by highly aggressive bubble collapse damage and a build-up of degraded components of the working liquid on the cantilevered element.

Designs for thermal ink jet bubble forming heater resistors which reduce current crowding have been disclosed by Giere, et al., in U. S. Pat. No. 6,280,019; by Cleland in U.S. Pat. Nos. 6,123,419 and 6,290,336; and by Prasad, et al., in U.S. Pat. No. 6,309,052. Thermal ink jet physical processes, device component configurations and design constraints, addressed by these disclosures, have substantial technical differences from a cantilevered element thermo-mechanical actuator and drop emitter. The thermal ink jet device must generate vapor bubbles to eject drops, a thermo-mechanical drop emitter preferably avoids vapor bubble formation.

Configurations and methods of operation for cantilevered element thermal actuators are needed which can be operated at high repetition frequencies and with maximum force of actuation, while avoiding locations of extreme temperature or generating vapor bubbles.

SUMMARY OF THE INVENTION

It is therefore an object of the present invention to provide a thermo-mechanical actuator which does not have locations which reach excessive, debilitating, temperatures, and which can be operated at high repetition frequencies and for millions of cycles of use without failure.

It is also an object of the present invention to provide a liquid drop emitter which is actuated by a thermo-mechanical actuator which does not have locations which reach temperatures that cause vapor bubble formation in the working liquid.

The foregoing and numerous other features, objects and advantages of the present invention will become readily apparent upon a review of the detailed description, claims and drawings set forth herein. These features, objects and advantages are accomplished by constructing a thermal actuator for a micro-electromechanical device comprising a base element and a cantilevered element extending from the base element and normally residing at a first position before activation. The cantilevered element includes a first layer constructed of an electrically resistive material, such as titanium aluminide, patterned to have a first resistor segment and a second resistor segment each extending from the base element. The cantilevered element also includes a coupling segment patterned in the electrically resistive material, or a coupling device formed in an electrically active material, that conducts electrical current serially between the first and second resistor segments. A second layer constructed of a dielectric material having a low coefficient of thermal expansion is attached to the first layer. A first electrode connected to the first resistor segment and a second electrode connected to the second resistor segment are provided to apply an electrical voltage pulse between the first and second electrodes thereby causing an activation power density in the first and second resistor segments and a power density maximum within the coupling segment or device, resulting in a deflection of the cantilevered element to a second position and wherein the power density maximum is less than four times the activation power density. The coupling segment may also be formed in a portion of the first layer wherein the electrically resistive material is thick or has been modified to have a substantially higher conductivity.

The present invention is particularly useful as a thermal actuator for liquid drop emitters used as printheads for DOD ink jet printing. In this preferred embodiment the thermal actuator resides in a liquid-filled chamber that includes a nozzle for ejecting liquid. The thermal actuator includes a cantilevered element extending from a wall of the chamber and a free end residing in a first position proximate to the nozzle. Application of a heat pulse to the cantilevered element causes deflection of the free end forcing liquid from the nozzle.

DETAILED DESCRIPTION OF THE INVENTION

The invention has been described in detail with particular reference to certain preferred embodiments thereof, but it will be understood that variations and modifications can be effected within the spirit and scope of the invention.

As described in detail herein below, the present invention provides apparatus for a thermal actuator and a drop-on-demand liquid emission device. The most familiar of such devices are used as printheads in ink jet printing systems. Many other applications are emerging which make use of devices similar to ink jet printheads, however which emit liquids other than inks that need to be finely metered and deposited with high spatial precision. The terms ink jet and liquid drop emitter will be used herein interchangeably. The inventions described below provide drop emitters based on thermo-mechanical actuators which are configured and operated so as to avoid locations of excessive temperature, hot spots, which might otherwise cause erratic performance and early device failure.

Figure 1:
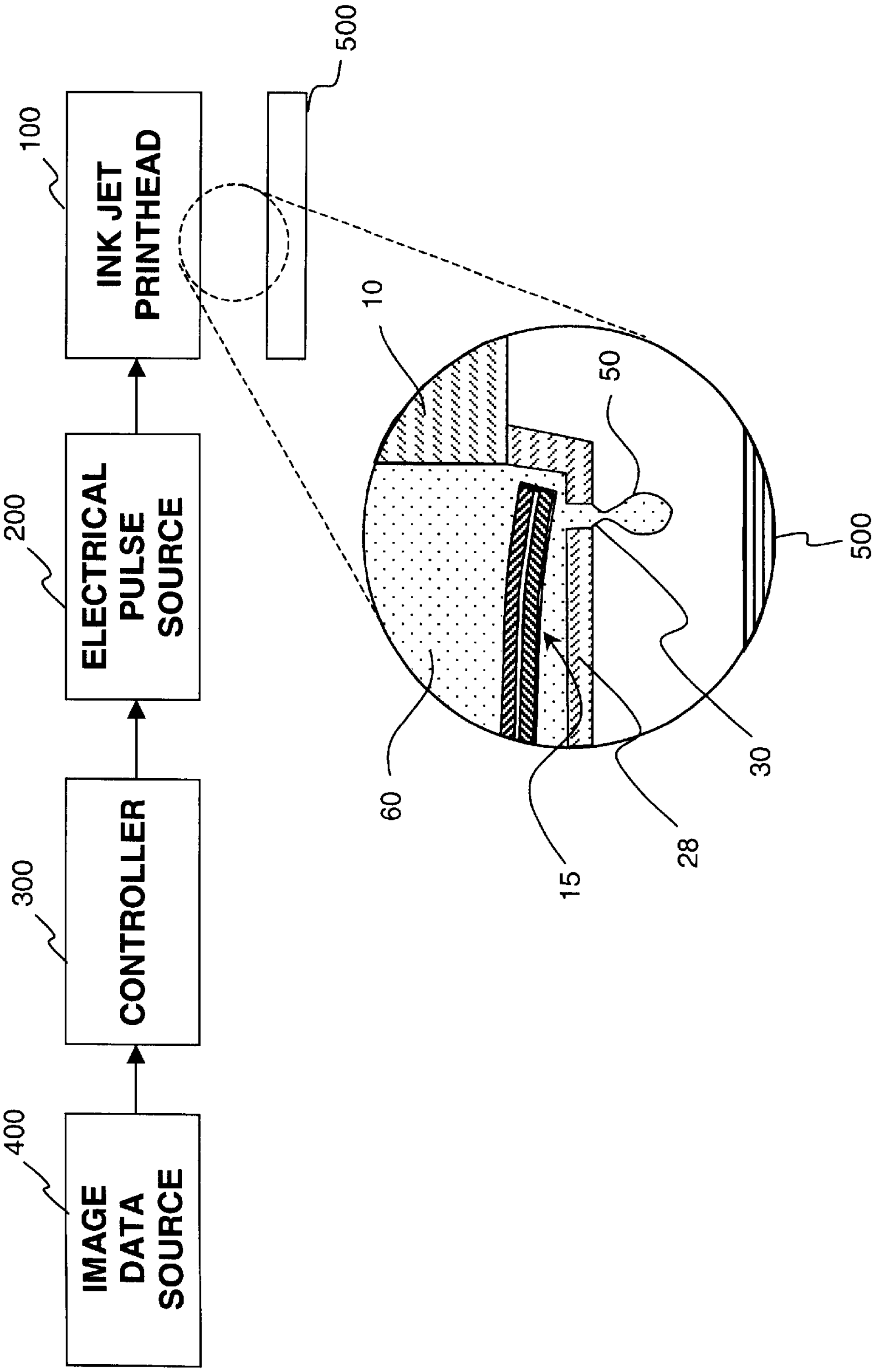
FIG. 1 is a schematic illustration of an ink jet system according to the present invention.

Turning first to FIG. 1, there is shown a schematic representation of an ink jet printing system which may use an apparatus and be operated according to the present invention. The system includes an image data source 400 which provides signals that are received by controller 300 as commands to print drops. Controller 300 outputs signals to a source of electrical pulses 200. Pulse source 200, in turn, generates an electrical voltage signal composed of electrical energy pulses which are applied to electrically resistive means associated with each thermo-mechanical actuator 15 within ink jet printhead 100. The electrical energy pulses cause a thermo-mechanical actuator 15 (herein after "thermal actuator") to rapidly bend, pressurizing ink 60 located at nozzle 30, and emitting an ink drop 50 which lands on receiver 500.

Figure 2:
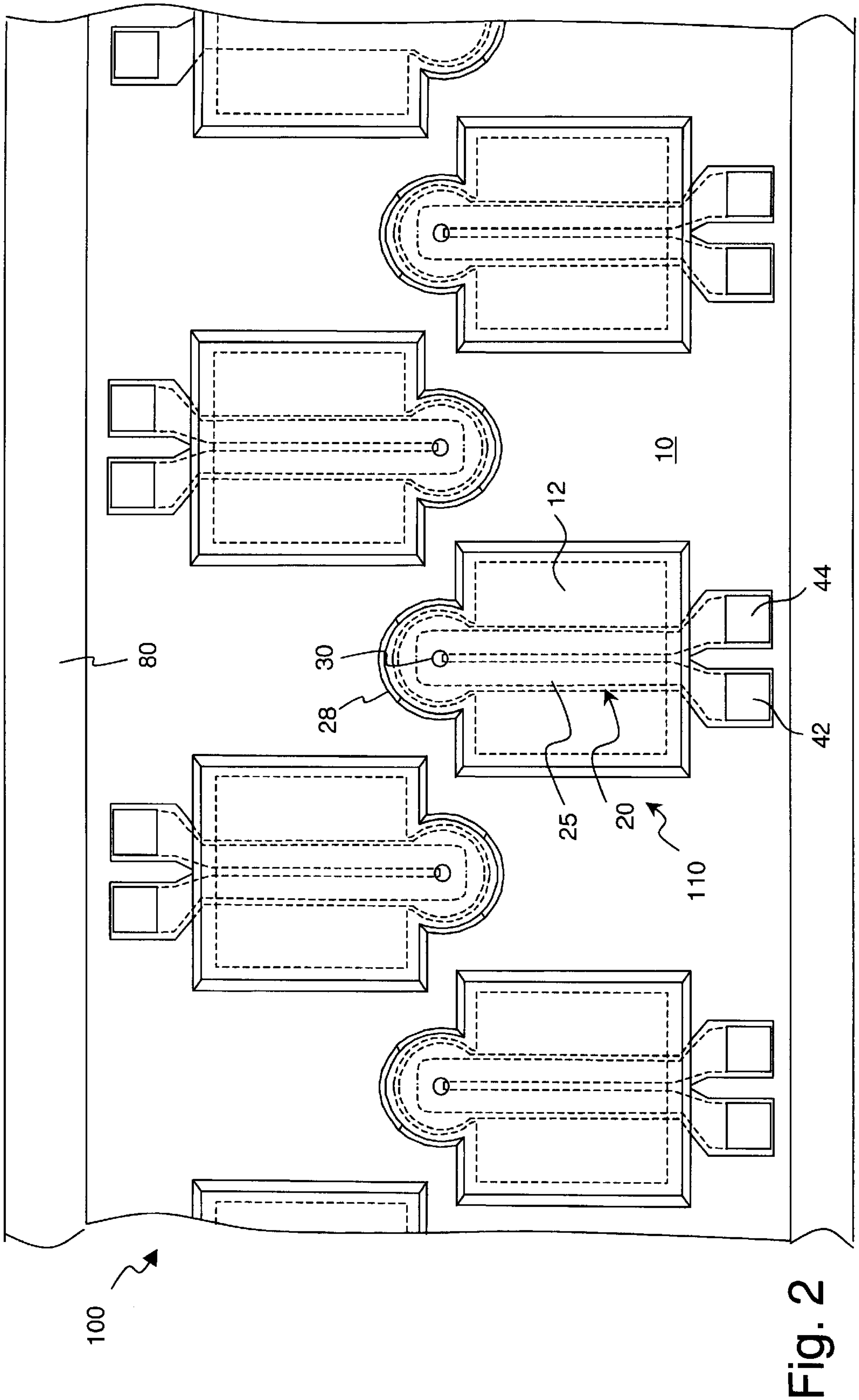
FIG. 2 is a plan view of an array of ink jet units or liquid drop emitter units according to the present invention.

FIG. 2 shows a plan view of a portion of ink jet printhead 100. An array of thermally actuated ink jet units 110 is shown having nozzles 30 centrally aligned, and ink chambers 12, interdigitated in two rows. The ink jet units 110 are formed on and in a substrate 10 using microelectronic fabrication methods. An example fabrication sequence which may be used to form drop emitters 110 is described in co-pending application Ser. No. 09/726,945 filed Nov. 30, 2000, for "Thermal Actuator", assigned to the assignee of the present invention.

Each drop emitter unit 110 has associated electrical lead contacts 42, 44 which are formed with, or are electrically connected to, a heater resistor portion 25, shown in phantom view in FIG. 2. In the illustrated embodiment, the heater resistor portion 25 is formed in a first layer of the thermal actuator 15 and participates in the thermo-mechanical effects as will be described. Element 80 of the printhead 100 is a mounting structure which provides a mounting surface for microelectronic substrate 10 and other means for interconnecting the liquid supply, electrical signals, and mechanical interface features.

Figure 3A:
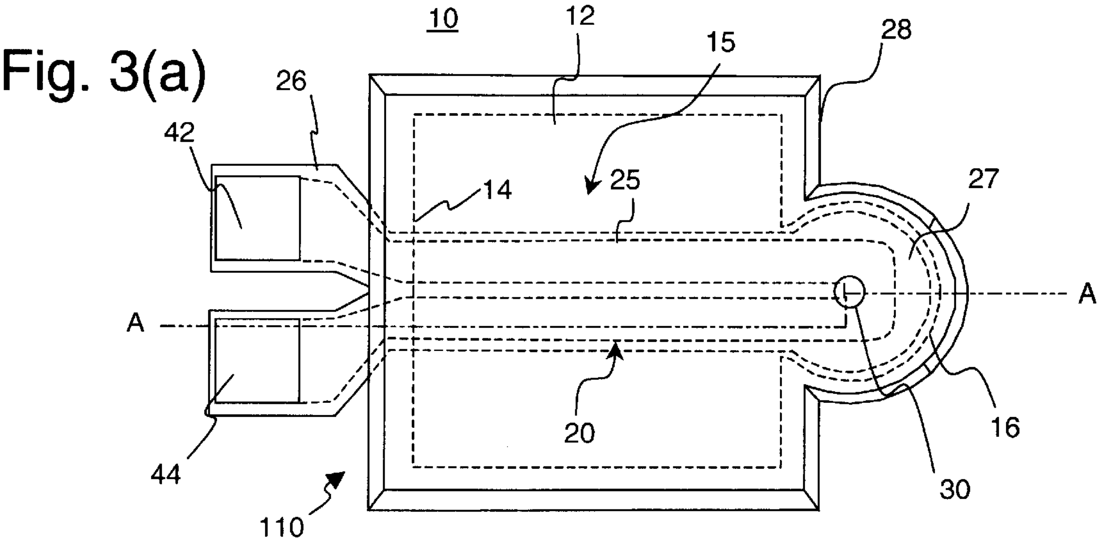
FIGS. 3 (*a*) and 3 (*b*) is an enlarged plan view of an individual ink jet unit shown in FIG. 2, FIGS. 4 (*a*) and 4 (*b*) is a side view illustrating the movement of a thermal actuator according to the present invention.
Figure 3B:
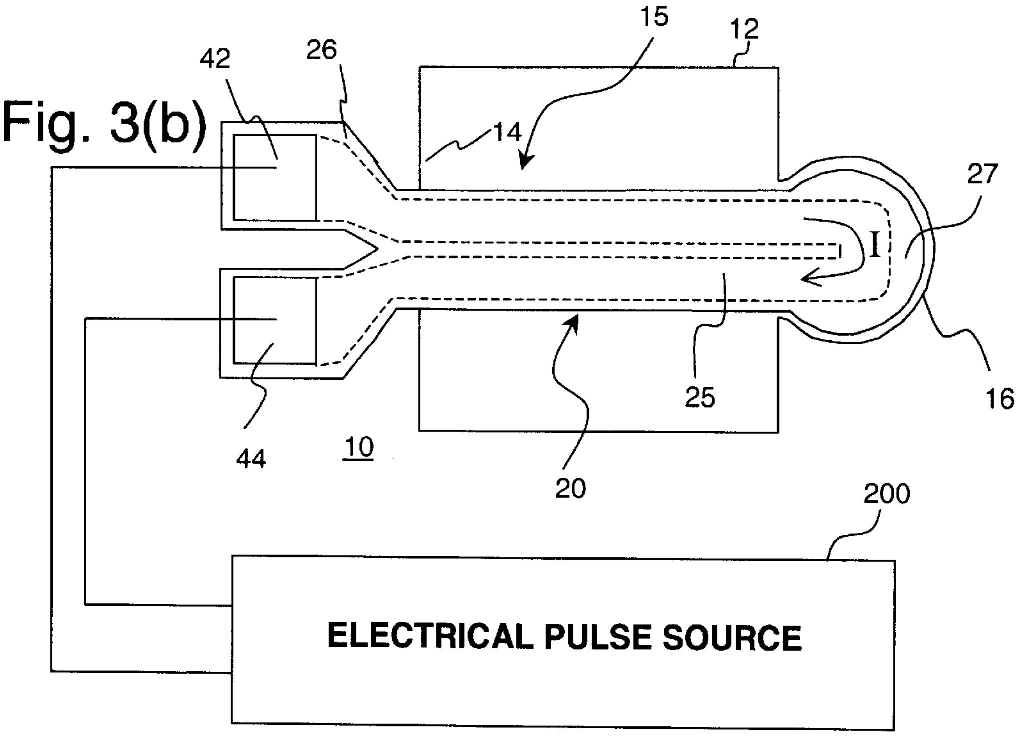

FIG. 3*a* illustrates a plan view of a single drop emitter unit 110 and a second plan view FIG. 3*b* with the liquid chamber cover 28, including nozzle 30, removed.

The thermal actuator 15, shown in phantom in FIG. 3*a* can be seen with solid lines in FIG. 3*b*. The cantilevered element 20 of thermal actuator 15 extends from edge 14 of liquid chamber 12 which is formed in substrate 10. Cantilevered element anchor portion 26 is bonded to substrate 10 and anchors the cantilever.

The cantilevered element 20 of the actuator has the shape of a paddle, an extended flat shaft ending with a disc of larger diameter than the shaft width. This shape is merely illustrative of cantilever actuators which can be used, many other shapes are applicable. The paddle shape aligns the nozzle 30 with the center of the cantilevered element free end portion 27. The fluid chamber 12 has a curved wall portion at 16 which conforms to the curvature of the free end portion 27, spaced away to provide clearance for the actuator movement.

FIG. 3*b* illustrates schematically the attachment of electrical pulse source 200 to the resistive heater 25 at interconnect terminals 42 and 44. Voltage differences are applied to voltage terminals 42 and 44 to cause resistance heating via u-shaped resistor 25. This is generally indicated by an arrow showing a current I. In the plan views of FIG. 3, the actuator free end portion 27 moves toward the viewer when pulsed and drops are emitted toward the viewer from the nozzle 30 in cover 28. This geometry of actuation and drop emission is called a "roof shooter" in many ink jet disclosures.

Figure 4A:
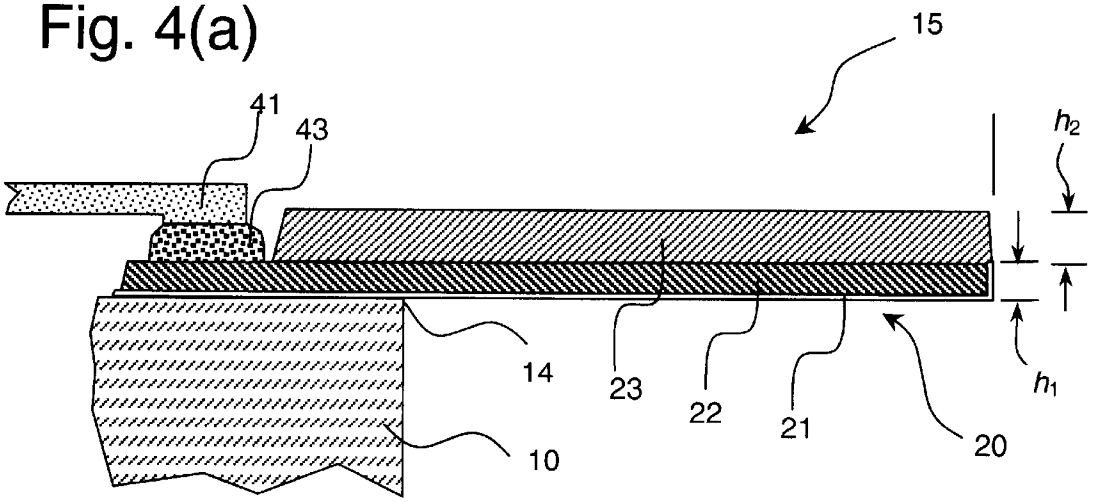
Figure 4B:
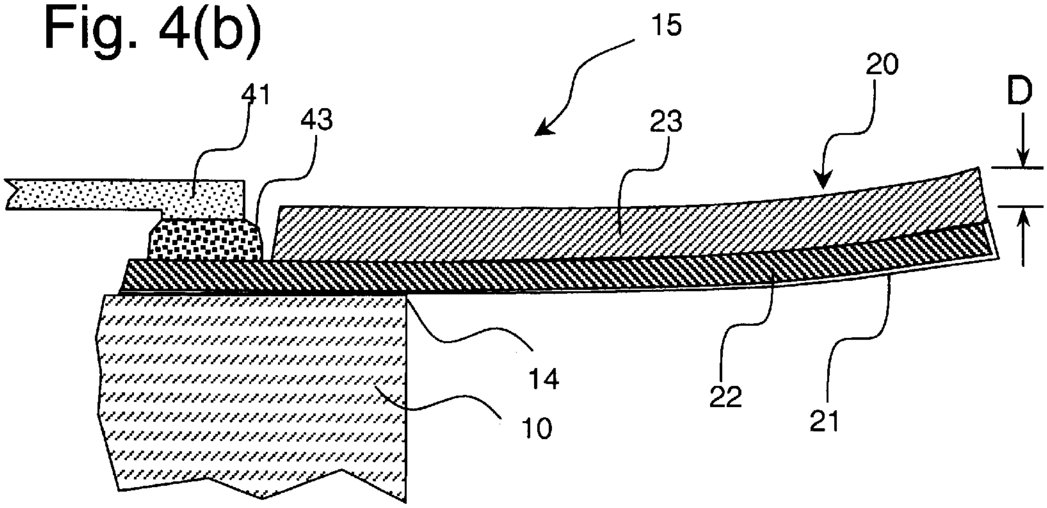

FIG. 4 illustrates in side view a cantilevered thermal actuator 15 according to a preferred embodiment of the present invention. In FIG. 4*a* the actuator is in a first position and in FIG. 4*b* it is shown deflected upward to a second position. Cantilevered element 20 extends a length L from an anchor location 14 of base element 10. The cantilevered element 20 is constructed of several layers. First layer 22 causes the upward deflection when it is thermally elongated with respect to other layers in the cantilevered element 20. It is constructed of an electrically resistive material, preferably intermetallic titanium aluminide, that has a large coefficient of thermal expansion. First layer 22 has a thickness of $h_1$.

The cantilevered element 20 also includes a second layer 23, attached to the first layer 22. The second layer 23 is constructed of a material having a low coefficient of thermal expansion, with respect to the material used to construct the first layer 22. The thickness of second layer 23 is chosen to provide the desired mechanical stiffness and to maximize the deflection of the cantilevered element for a given input of heat energy. Second layer 23 may also be a dielectric insulator to provide electrical insulation for resistive heater segments and current coupling devices and segments formed into the first layer or in a third material used in some preferred embodiments of the present inventions. The second layer may be used to partially define electroresistor and coupler segments formed as portions of first layer 22. Second layer 23 has a thickness of $h_2$.

Second layer 23 may be composed of sub-layers, laminations of more than one material, so as to allow optimization of functions of heat flow management, electrical isolation, and strong bonding of the layers of the cantilevered element 20.

Passivation layer 21 shown in FIG. 4 is provided to protect the first layer 22 chemically and electrically. Such protection may not be needed for some applications of thermal actuators according to the present invention, in which case it may be deleted. Liquid drop emitters utilizing thermal actuators which are touched on one or more surfaces by the working liquid may require passivation layer 21 which is chemically and electrically inert to the working liquid.

A heat pulse is applied to first layer 22, causing it to rise in temperature and elongate. Second layer 23 does not elongate nearly as much because of its smaller coefficient of thermal expansion and the time required for heat to diffuse from first layer 22 into second layer 23. The difference in length between first layer 22 and the second layer 23 causes the cantilevered element 20 to bend upward as illustrated in FIG. 4*b*. When used as actuators in drop emitters, the bending response of the cantilevered element 20 must be rapid enough to sufficiently pressurize the liquid at the nozzle. Typically, electroresistive heating apparatus is adapted to apply heat pulses and an electrical pulse duration of less than 4 $\mu$secs is used and, preferably, a duration less than 2 $\mu$secs.

FIGS. 5 through 10 illustrate fabrication processing steps for constructing a single liquid drop emitter according to some of the preferred embodiments of the present invention.

For these embodiments the first layer 22 is constructed using an electrically resistive material, such as titanium aluminide, and a portion is patterned into a resistor for carrying electrical current, I.

Figure 5:
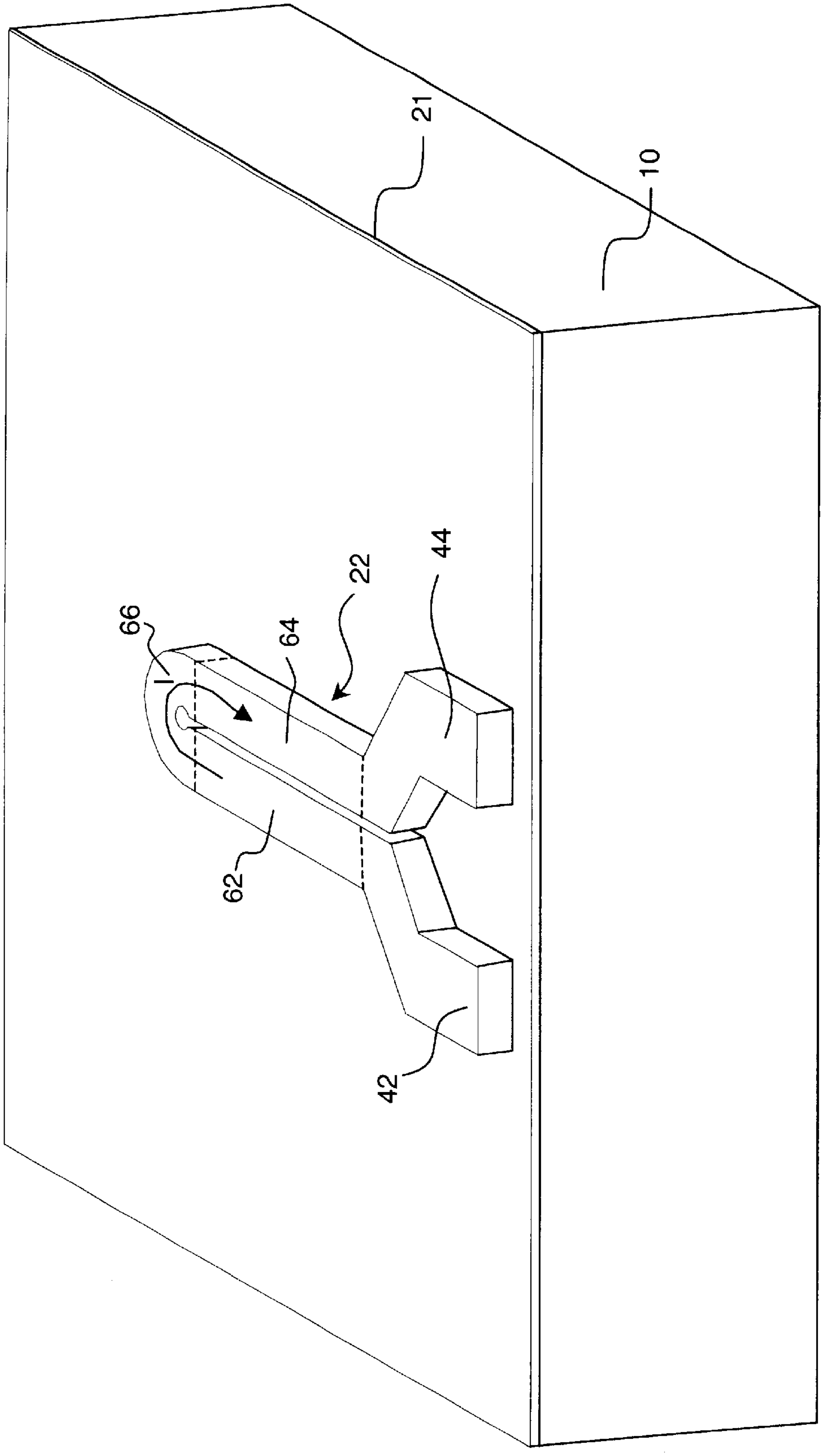
FIG. 5 is a perspective view of the early stages of a process suitable for constructing a thermal actuator according to the present invention wherein a first layer of electrically resistive material of the cantilevered element is formed.

FIG. 5 illustrates a first layer 22 of a cantilever in a first stage of fabrication. The illustrated structure is formed on a substrate 10, for example, single crystal silicon, by standard microelectronic deposition and patterning methods. A portion of substrate 10 will also serve as a base element from which cantilevered element 20 extends. Deposition of intermetallic titanium aluminide may be carried out, for example, by RF or pulsed DC magnetron sputtering. An example deposition process that may be used for titanium aluminide is described in co-pending application Ser. No. 09/726,945 filed Nov. 30, 2000, for "Thermal Actuator", assigned to the assignee of the present invention.

First layer 22 is deposited with a thickness of $h_1$. First and second resistor segments 62 and 64 are formed in first layer 22 by removing a pattern of the electrically resistive material. In addition, a current coupling segment 66 is formed in the first layer material which conducts current serially between the first resistor segment 62 and the second resistor segment 64. The current path is indicated by an arrow and letter "I". Coupling segment 66, formed in the electrically resistive material, will also heat the cantilevered element when conducting current. However this coupler heat energy, being introduced at the tip end of the cantilever, is not important or necessary to the deflection of the thermal actuator. The primary function of coupler segment 66 is to reverse the direction of current.

Addressing electrical leads 42 and 44 are illustrated as being formed in the first layer 22 material as well. Leads 42, 44 may make contact with circuitry previously formed in base element substrate 10 or may be contacted externally by other standard electrical interconnection methods, such as tape automated bonding (TAB) or wire bonding. A passivation layer 21 is formed on substrate 10 before the deposition and patterning of the first layer 22 material. This passivation layer may be left under first layer 22 and other subsequent structures or removed in a subsequent patterning process.

Figure 6:
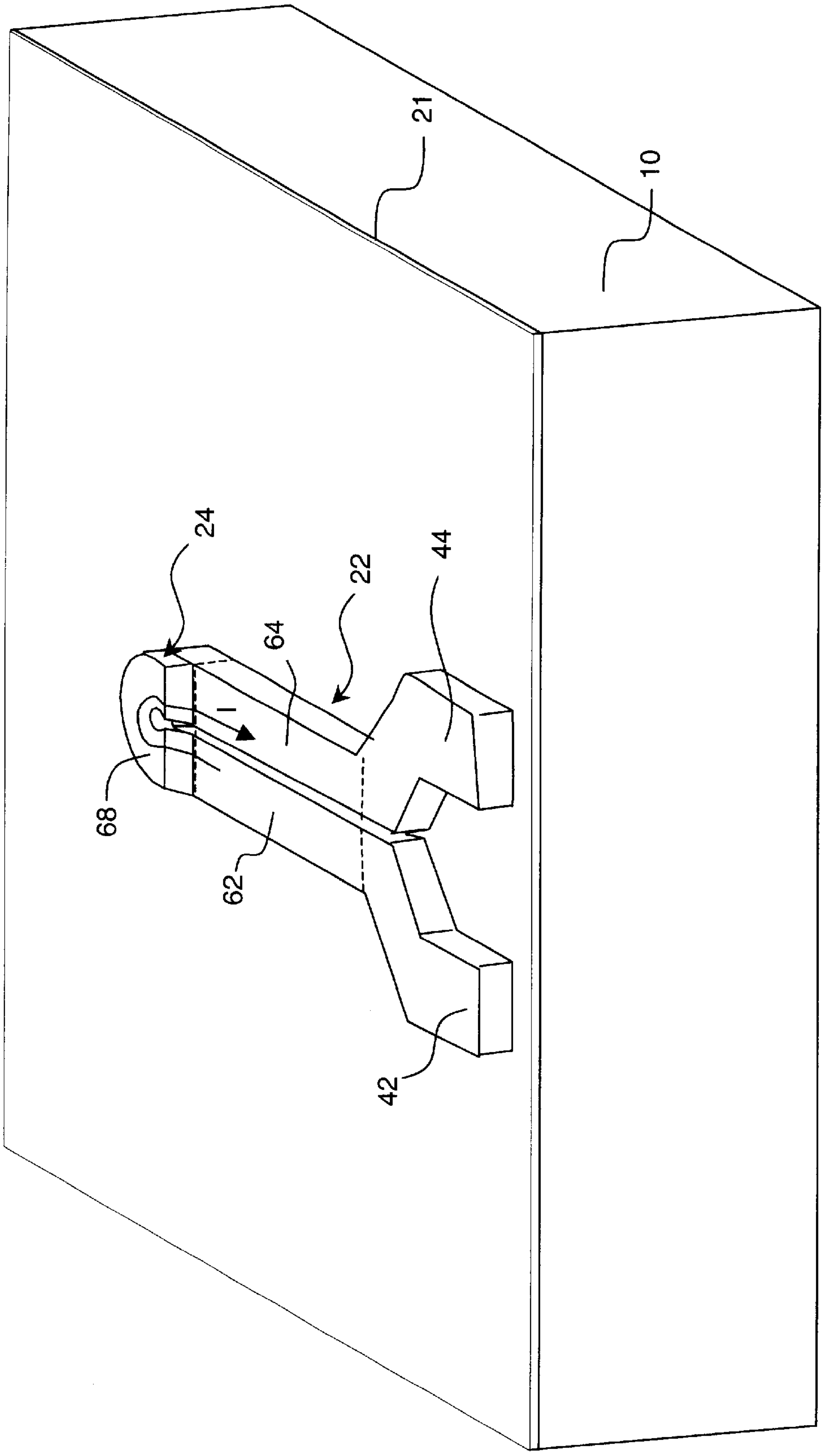
FIG. 6 is a perspective view of a next process stage for some preferred embodiments the present invention wherein a third layer of an electrically active material is added and a coupling device formed therein.

FIG. 6 illustrates a next fabrication step for some preferred embodiments of the present inventions. A third layer 24, comprised of an electrically active material, is added and patterned into a coupler device 68 which conducts activation current between first and second resistor segments 62 and 64. The electrically active material is preferably substantially more conductive than the electrically resistive material used for first layer 22. Typically layer 24 will be formed of a metal conductor such as aluminum. However, overall fabrication process design considerations may be better served by other higher temperature materials, such as silicides, which have less conductivity than a metal but substantially higher conductivity than the conductivity of the electrically resistive material. As will be explained hereinbelow, the purpose of forming the coupler device 68 in a good conductor material is to lower the power density, thereby eliminating debilitating hot spots.

Figure 7:
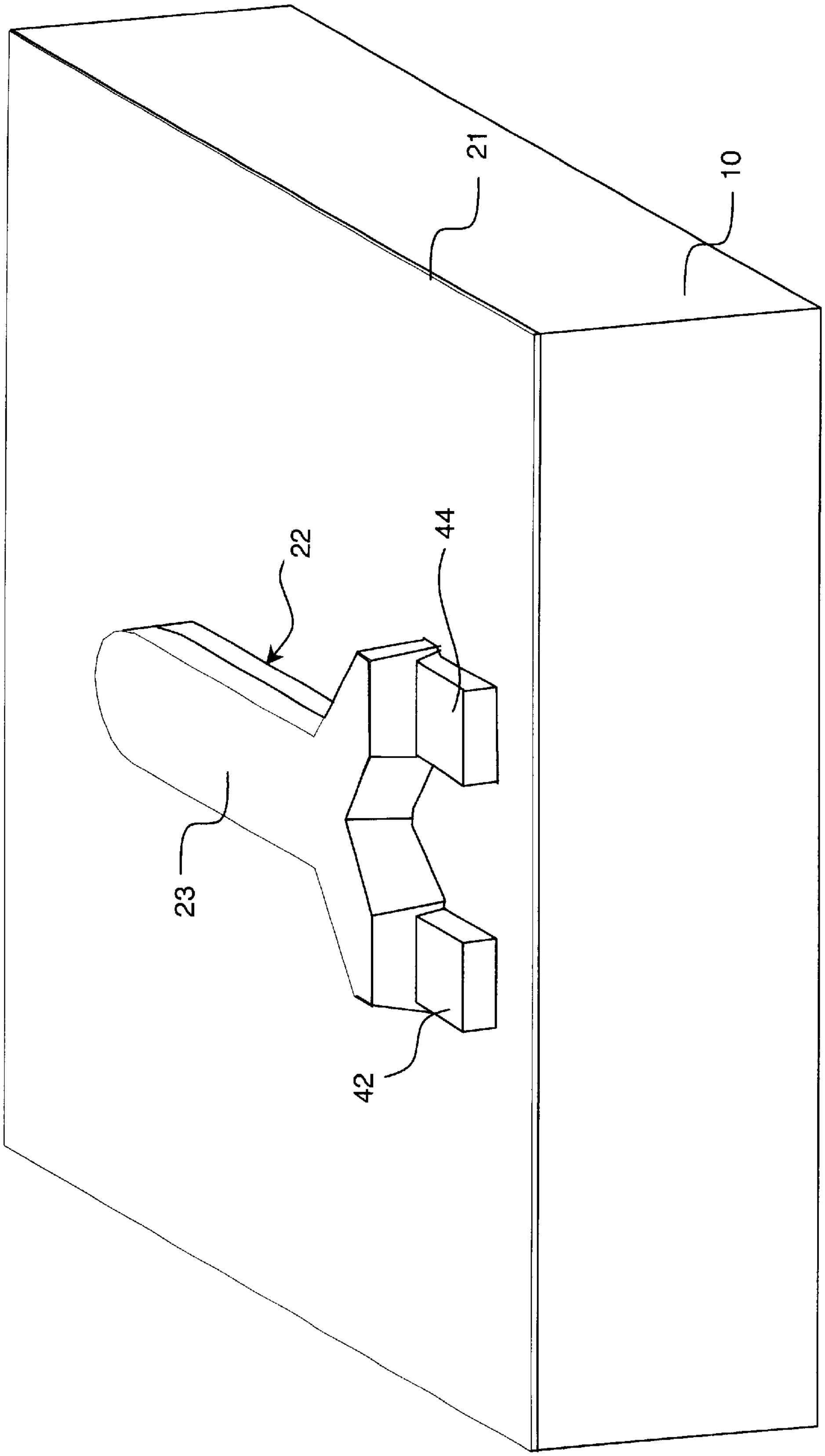
FIG. 7 is a perspective view of the next stages of the process illustrated in FIG. 5 or 6 wherein a second layer of a dielectric material of the cantilevered element is formed.

FIG. 7 illustrates a second layer 23 having been deposited and patterned over the previously formed first layer 22 portion of the thermal actuator. For the alternate embodiment illustrated in FIG. 6, second layer 23 would also cover the coupler device portion of a remaining layer 24. Second layer 23 is formed over the first layer 22 covering the remaining resistor pattern. Second layer 23 is deposited with a thickness of $h_2$. The second layer 23 material has low coefficient of thermal expansion compared to the material of first layer 22. For example, second layer 23 may be silicon dioxide, silicon nitride, aluminum oxide or some multi-layered lamination of these materials or the like.

Additional passivation materials may be applied at this stage over the second layer 23 for chemical and electrical protection. Also, the initial passivation layer 21 is patterned away from areas through which fluid will pass from openings to be etched in substrate 10.

Figure 8:
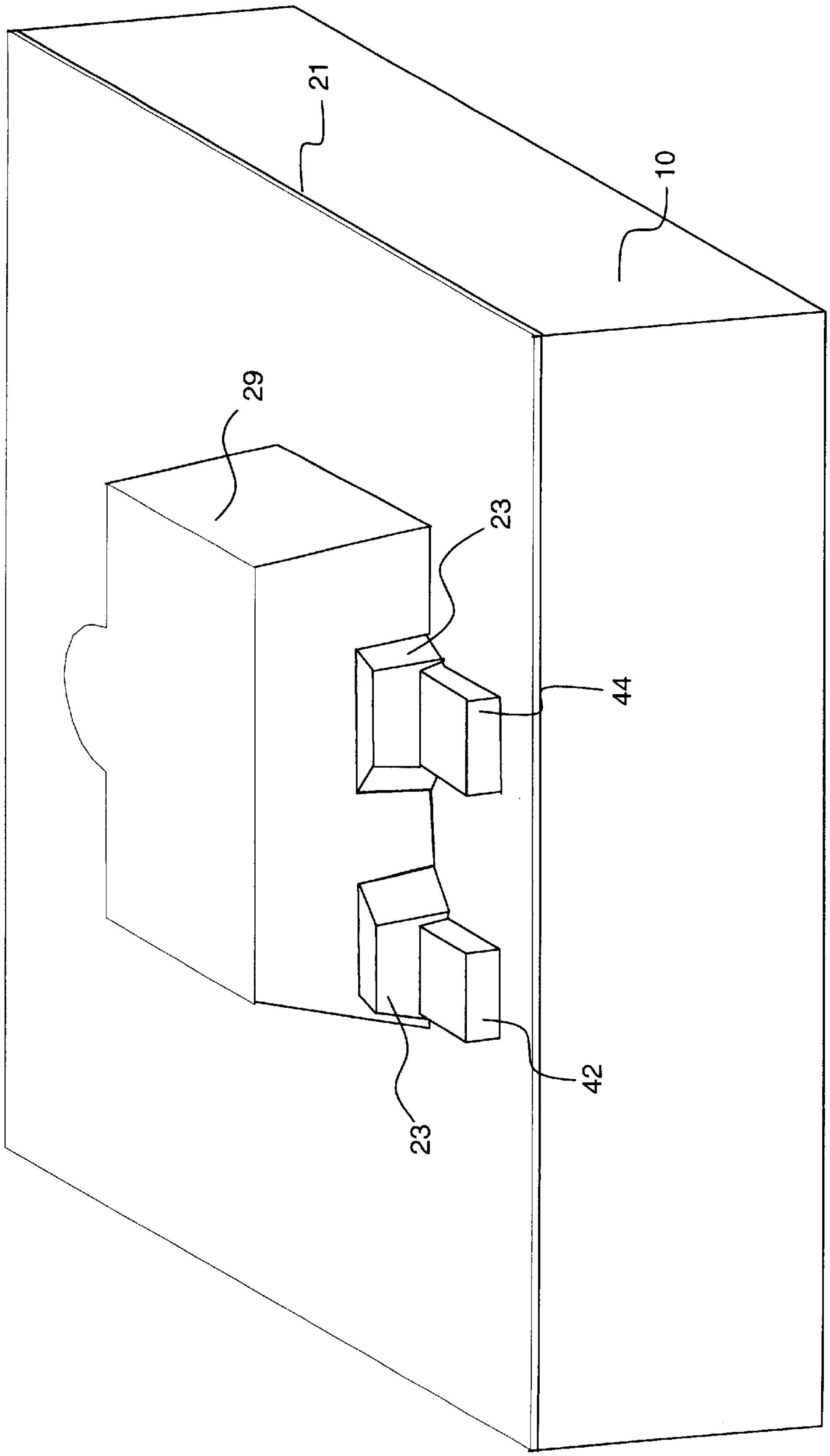
FIG. 8 is a perspective view of the next stages of the process illustrated in FIGS. 5–7 wherein a sacrificial layer in the shape of the liquid filling a chamber of a drop emitter according to the present invention is formed.

FIG. 8 shows the addition of a sacrificial layer 29 which is formed into the shape of the interior of a chamber of a liquid drop emitter. A suitable material for this purpose is polyimide. Polyimide is applied to the device substrate in sufficient depth to also planarize the surface which has the topography of the first 22, second 23 and optionally third 24 layers as illustrated in FIGS. 5–7. Any material which can be selectively removed with respect to the adjacent materials may be used to construct sacrificial structure 29.

Figure 9:
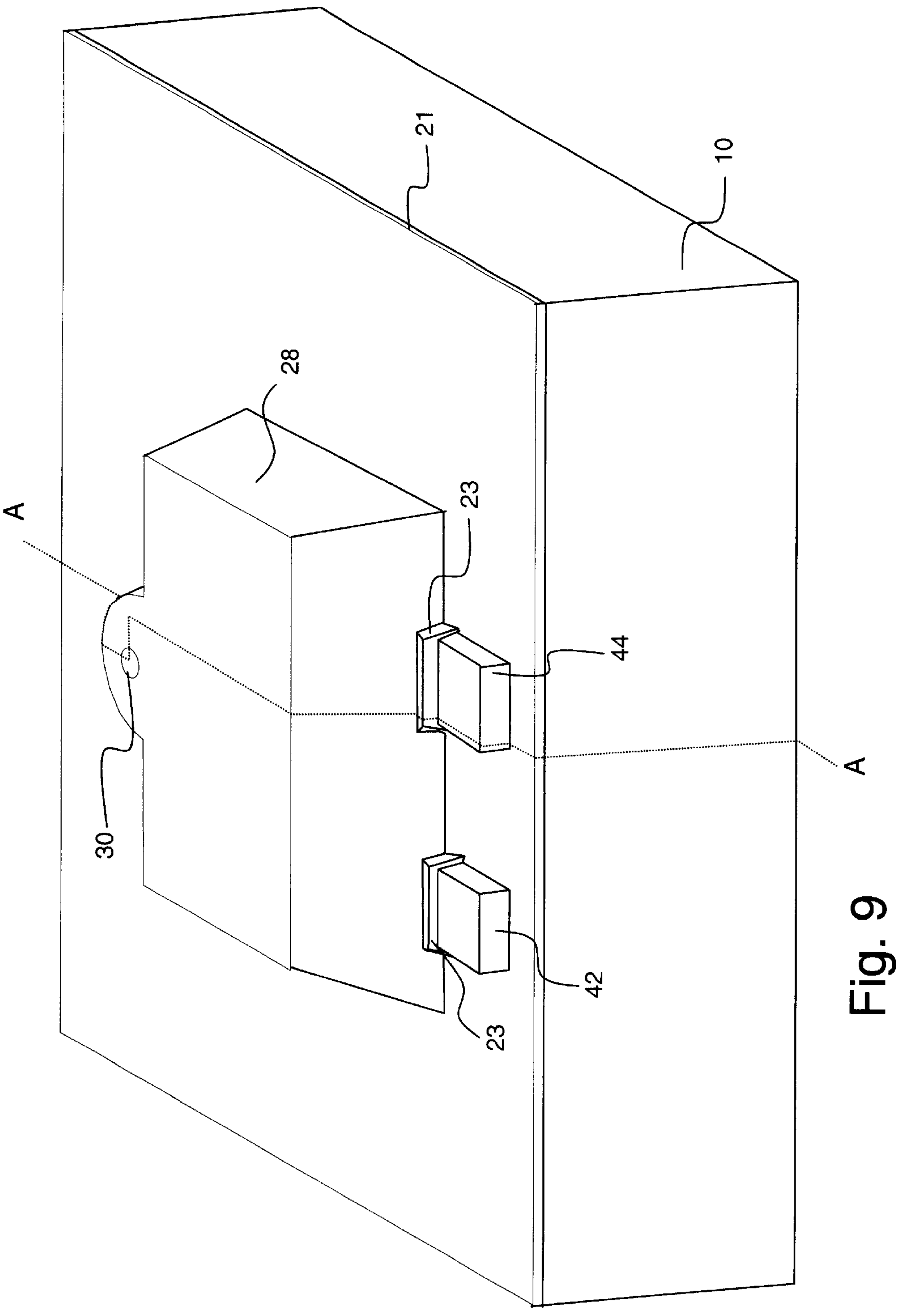
FIG. 9 is a perspective view of the next stages of the process illustrated in FIGS. 5–8 wherein a liquid chamber and nozzle of a drop emitter according to the present invention is formed.

FIG. 9 illustrates drop emitter liquid chamber walls and cover formed by depositing a conformal material, such as plasma deposited silicon oxide, nitride, or the like, over the sacrificial layer structure 29. This layer is patterned to form drop emitter chamber 28. Nozzle 30 is formed in the drop emitter chamber, communicating to the sacrificial material layer 29, which remains within the drop emitter chamber 28 at this stage of the fabrication sequence.

Figure 10A:
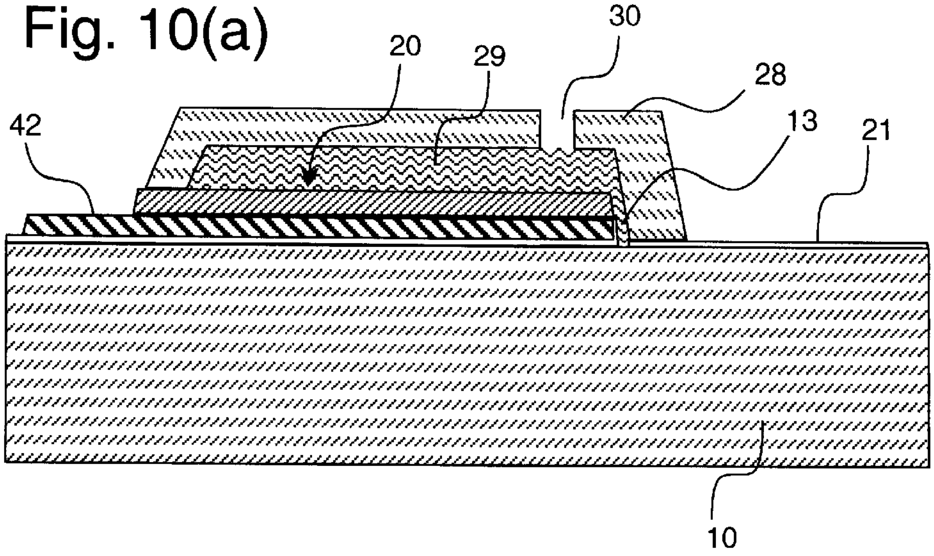
FIGS. 10 (*a*)–10 (*c*) is a side view of the final stages of the process illustrated in FIGS. 5–9 wherein a liquid supply pathway is formed and the sacrificial layer is removed to complete a liquid drop emitter according to the present invention.

FIG. 10 shows a side view of the device through a section indicated as A—A in FIG. 9. In FIG. 10*a* the sacrificial layer 29 is enclosed within the drop emitter chamber walls 28 except for nozzle opening 30. Also illustrated in FIG. 10*a*, the substrate 10 is intact. Passivation layer 21 has been removed from the surface of substrate 10 in gap area 13 and around the periphery of the cantilevered element 20. The removal of layer 21 in these locations was done at a fabrication stage before the forming of sacrificial structure 29.

Figure 10B:
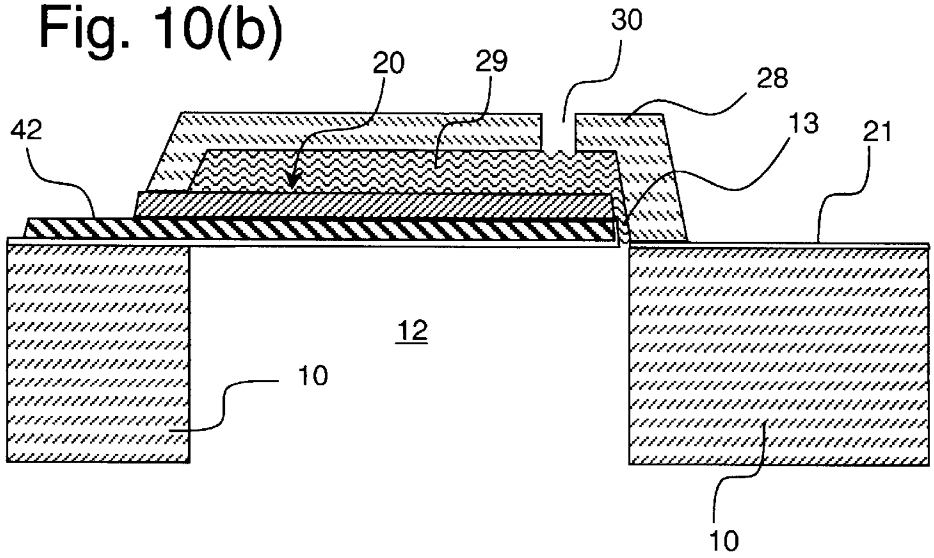

In FIG. 10*b*, substrate 10 is removed beneath the cantilever element 20 and the liquid chamber areas around and beside the cantilever element 20. The removal may be done by an anisotropic etching process such as reactive ion etching, or such as orientation dependent etching for the case where the substrate used is single crystal silicon. For constructing a thermal actuator alone, the sacrificial structure and liquid chamber steps are not needed and this step of etching away substrate 10 may be used to release the cantilevered element 20.

Figure 10C:
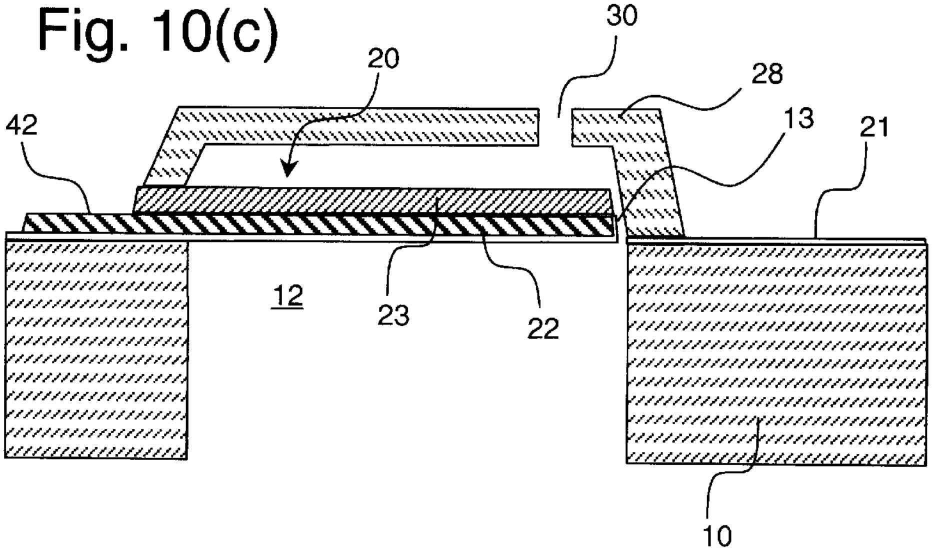

In FIG. 10*c* the sacrificial material layer 29 has been removed by dry etching using oxygen and fluorine sources. The etchant gasses enter via the nozzle 30 and from the newly opened fluid supply chamber area 12, etched previously from the backside of substrate 10. This step releases the cantilevered element 20 and completes the fabrication of a liquid drop emitter structure.

Figure 11A:
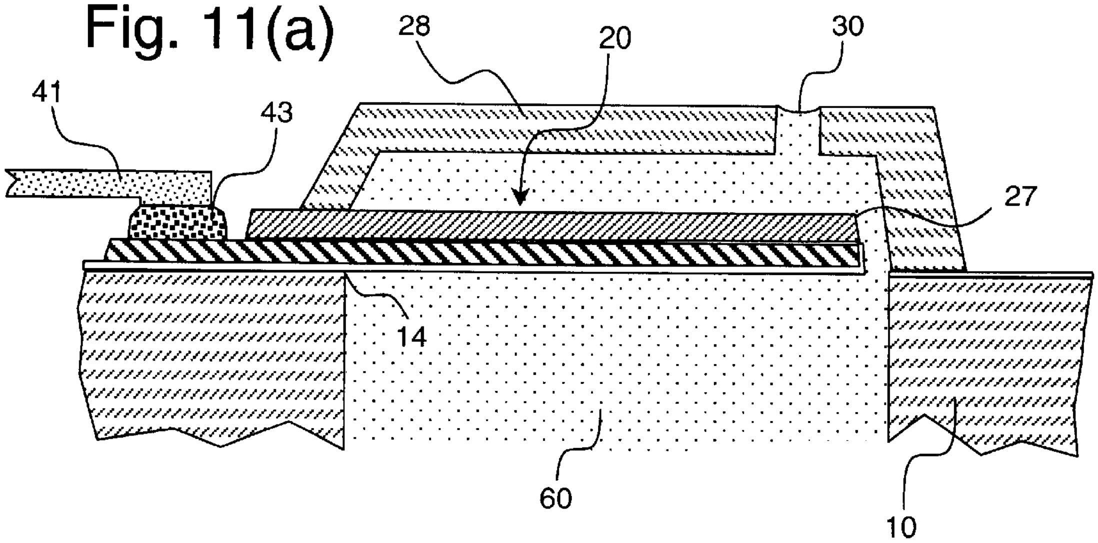
FIGS. 11 (*a*) and 11 (*b*) is a side view illustrating the operation of a drop emitter according the present invention.
Figure 11B:
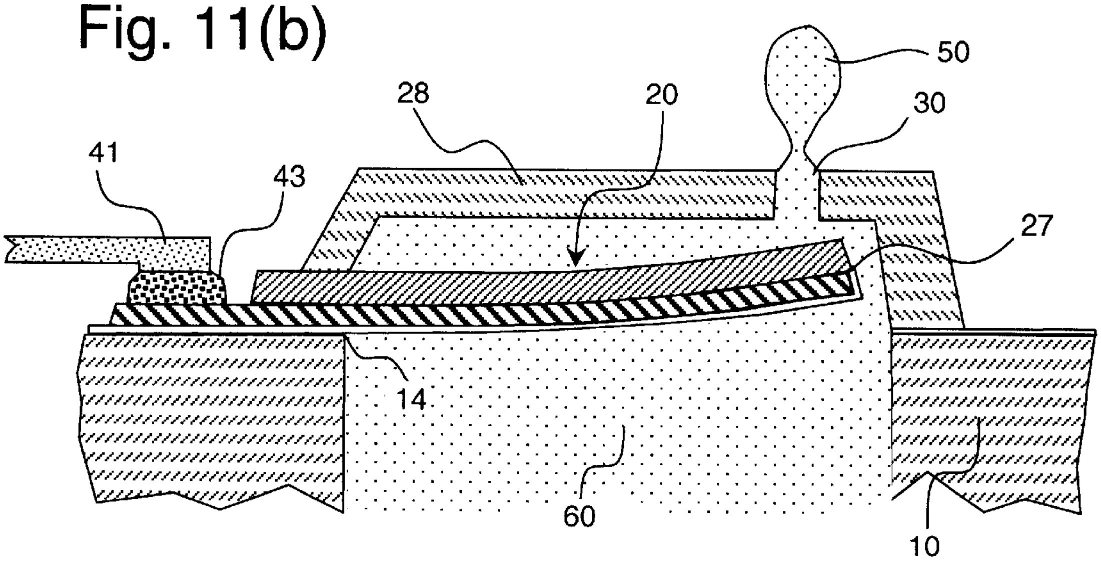

FIG. 11 illustrates a side view of a liquid drop emitter structure according to some preferred embodiments of the present invention. FIG. 11*a* shows the cantilevered element 20 in a first position proximate to nozzle 30. FIG. 11*b* illustrates the deflection of the free end 27 of the cantilevered element 20 towards nozzle 30. Rapid deflection of the cantilevered element to this second position pressurizes liquid 60 causing a drop 50 to be emitted.

In an operating emitter of the cantilevered element type illustrated, the quiescent first position may be a partially bent condition of the cantilevered element 20 rather than the horizontal condition illustrated FIG. 11*a*. The actuator may be bent upward or downward at room temperature because of internal stresses that remain after one or more microelectronic deposition or curing processes. The device may be operated at an elevated temperature for various purposes, including thermal management design and ink property control. If so, the first position may be as substantially bent as is illustrated in FIG. 11*b*.

For the purposes of the description of the present invention herein, the cantilevered element will be said to be quiescent or in its first position when the free end is not significantly changing in deflected position. For ease of understanding, the first position is depicted as horizontal in FIG. 4*a* and FIG. 10*a*. However, operation of thermal actuators about a bent first position are known and anticipated by the inventors of the present invention and are fully within the scope of the present inventions.

FIGS. 5 through 10 illustrate a preferred fabrication sequence. However, many other construction approaches may be followed using well known microelectronic fabrication processes and materials. For the purposes of the present invention, any fabrication approach which results in a cantilevered element including a first layer 22, a second layer 23 and optional third layer 24 may be followed. Further, in the illustrated sequence of FIGS. 5 through 10, the liquid chamber 28 and nozzle 30 of a liquid drop emitter were formed in situ on substrate 10. Alternatively a thermal actuator could be constructed separately and bonded to a liquid chamber component to form a liquid drop emitter.

Figure 12:
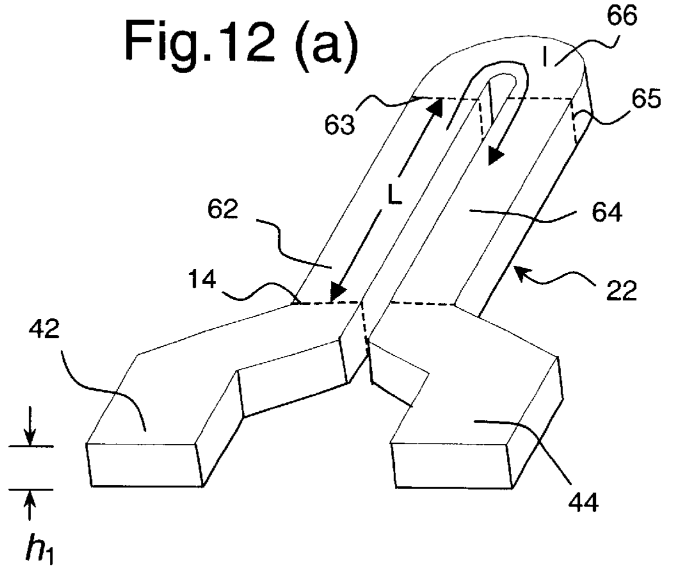
FIGS. 12 (*a*)–12 (*c*) is a perspective and plan view of a first layer design and an equivalent circuit which illustrates the occurrence of an undesirable hot spot.

The inventors of the present inventions have discovered that the operation of a liquid drop emitter utilizing a cantilevered element thermal actuator may generate vapor bubbles in the working fluid at points adjacent to hot spot locations on the cantilever. FIG. 12 illustrates the observed phenomena. FIG. 12*a* illustrates a u-shaped heating resistor arrangement formed in an electrically resistive material used to construct the first layer 22 of a cantilevered element thermal actuator. The resistor arrangement includes two elongated portions, first resistor segment 62 and second resistor segment 64, extending in parallel from the location 14 at which the cantilever is anchored, to locations 63 and 65, respectively, where they are connected to arcuate-shaped coupler segment 66. Electrical pulses are applied between first electrode 42 and second electrode 44 to cause resistive heating of the first layer 22 which will result in deflection of the cantilevered element.

Figure 12B:
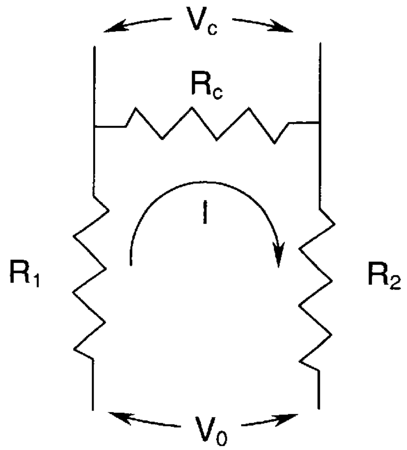

FIG. 12*b* illustrates an equivalent circuit which is useful in understanding the resistor arrangement of FIG. 12*a*. First resistor segment 62 is captured as a first resistor, $R_1$, second resistor segment 64 is captured as a second resistor $R_2$, and the coupler segment 66 is captured as a coupler resistor $R_C$. Application of a voltage $V_0$ applied across the first and second electrodes 42 and 44, causes an electrical current I to pass around the equivalent circuit. The actual voltage applied to the first and second resistor segments beginning at the anchor point location 14, and coupler segment, will be reduced by parasitic resistances that may exist in the first and second electrodes and material runs up to the anchor location 14. These are ignored for this explanation for clarity of understanding the present inventions. The voltage drop across the coupler segment 66 is denoted as $V_C$ in the equivalent circuit diagram, FIG. 12*b*.

Figure 12C:
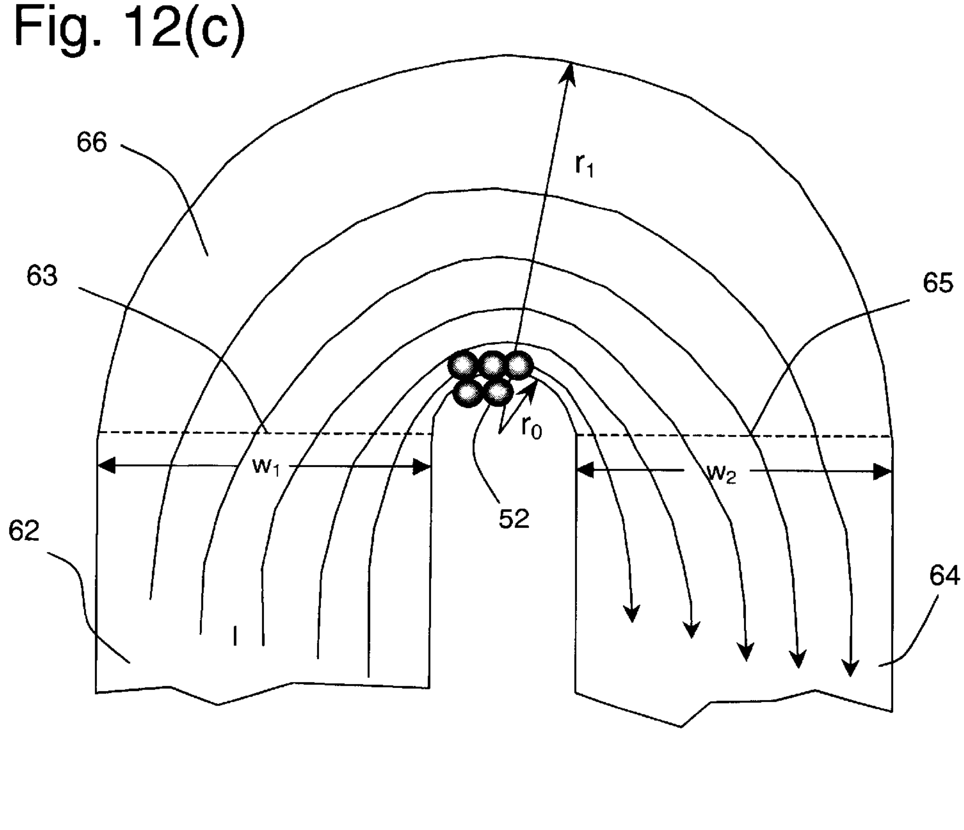

FIG. 12*c* is a plan view enlargement of the end of the first layer 22 of the cantilevered element showing the coupler segment 66 and portions of the first and second resistor segments 62 and 64. First resistor segment 62 has a width $w_1$ at the location 63 where it connects to coupler segment 66. Second resistor segment 64 has a width $w_2$ at location 65 where it connects to coupler segment 66. First and second resistor segments 62 and 64 are formed in first layer 22 having a thickness of $h_1$ and made of an electrically resistive material having a nominal conductivity of $\sigma_0$. The first and second resistor segments 62 and 64 illustrated in FIG. 12 are generally rectangular in shape, extending a length $L_0$ between anchor location 14 and coupler connecting locations 63 and 65 respectively. The equivalent first and second resistor values are therefore:

$$R_1 = \frac{L_0}{\sigma_0 h_1 w_1},\ R_2 = \frac{L_0}{\sigma_0 h_1 w_2}. \tag{1}$$

Coupler segment 66 is illustrated as a half annulus having an inner radius of $r_0$ and an outer radius of $r_1$. The resistance varies from the inner radius to the outer radius because the current path length is shorter at $r_0$ than at $r_1$. Since the voltage drop, $V_C$ is the same for all paths, the current density, J=current/area, will be higher along the inner radius than the outer radius. In FIG. 12*c* this is illustrated by showing the lines of current crowding toward the inner radius, $r_0$.

The current density is an important quantity because the rise in temperature is proportional to the square of the current density. Consider a volume of an electrically active material which has a length L, cross sectional area A, material conductivity σ, mass density ρ, heat capacity c, and conducting current I. The current density J is therefore:

$$J=I/A \tag{2}$$

Assuming, to first order, that the input electrical energy is converted to thermal energy, the volume under consideration, having a mass m, will rise in temperature by ΔT over an increment of time dt:

$$\text{Electrical Energy} = I^2Rdt = (JA)^2\frac{Ldt}{\sigma A} = \frac{J^2ALdt}{\sigma}; \tag{3}$$

$$\text{Thermal Energy} = Q = mc\Delta T = \rho ALc\Delta T; \tag{4}$$
$$\text{Thermal Energy} = \text{Electrical Energy};$$

$$\rho ALc\Delta T = \frac{J^2ALdt}{\sigma}; \tag{5}$$

$$\Delta T = \frac{J^2}{\sigma\rho c}dt. \tag{6}$$

Equation 6 shows that the temperature rise, to first order, is proportional to the square of the current density, $J^2$. The quantity $J^2/\sigma$ in Equation 6 is the electrical power density, PD, defined as the input electrical power/volume:

$$PD = \frac{I^2R}{V} = \frac{(JA)^2}{LA}\frac{L}{\sigma A} = \frac{J^2}{\sigma}; \tag{7}$$

$$\Delta T = \frac{PD}{\rho c}dt \tag{8}$$

Hence the understanding of hot spots in a cantilevered element thermal actuator is advanced by analyzing the current and power densities in the areas of current crowding.

The current $I_0$ that flows in the equivalent circuit illustrated in FIG. 12*b* is:

$$I_0 = \frac{V_0}{R_1 + R_2 + R_c}, \tag{9}$$

where $R_1$ and $R_2$ are given above in Equation 1. For simplicity of the analysis and understanding hereinbelow, it will be assumed that $w_1=w_2=w_0$, and $R_1=R_2=R_0$.

The equivalent resistance of the coupler segment, $R_C$, is found by integrating over the half-annulus shape as follows:

$$\frac{1}{R_c} = \int_{r_0}^{r_1} \frac{\sigma_c h_c}{\pi r}\, dr = \frac{\sigma_c h_c}{\pi}\ln\left(\frac{r_1}{r_0}\right), \tag{10}$$

where $h_C$ is the thickness of the electrically active material in the coupler segment or device and $\sigma_C$ is the conductivity of the electrically active material from which the coupler segment or device is constructed. For a coupler segment 66, formed in first layer 22, depicted in FIGS. 5 and 12*b*, $h_C=h_1$ and $\sigma_C=\sigma_0$. For a coupler device 68 formed in third layer 24, depicted in FIG. 6 and in FIG. 17, $h_C=h_3$ wherein an electrically active material having a conductivity $\sigma_C>>\sigma_0$ is used. For other preferred embodiments of the present invention, added third layer 24 may be composed of the same electrically resistive material used in the first layer material, in which case $h_C=h_1+h_3$ and $\sigma_C=\sigma_0$.

Some preferred embodiments of the present inventions are constructed by reducing the current and power densities in the coupler device or coupler segment by increasing the thickness of the electrically resistive material in the coupler segment, $h_C>h_1$, and others by increasing the conductivity of the material in the coupler segment or device, $\sigma_C>\sigma_0$. Increased conductivity may be achieved by in situ processing of the electrically resistive material forming first layer 22 to locally increase its conductivity or by employing a third layer 24 of an electrically active material which has a higher conductivity. Examples of in situ processing to increase conductivity include laser annealing, ion implantation through a mask, or resistive self-heating by application of high energy electrical pulses.

The current density, J(r), at a radius, r, within the half-annulus shape illustrated in FIG. 12*c* is found from the current, I(r), and the resistance R(r), by noting that the voltage, $V_C$, occurs across all arcuate increments, dr, of the annulus shape:

$$I(r) = \frac{V_c}{R(r)} = \frac{V_c}{\dfrac{\pi r}{\sigma_c h_c dr}} = \frac{V_c \sigma_c h_c dr}{\pi r}, \tag{11}$$

$$J(r) = \frac{I(r)}{h_c dr} = \frac{V_c \sigma_c}{\pi r} = \frac{I_0 R_c \sigma_c}{\pi r}, \tag{12}$$

where $V_C=I_0R_C$. Normalizing the above current density to the nominal current density in the first and second resistor segments, i.e. $J_0=I_0/h_1w_0$, and inserting the expression for $R_C$ given in equation 10, the normalized current density is:

$$J(r) = \frac{h_1}{h_c}\frac{w_0}{r}\frac{1}{\ln(r_1/r_0)}J_0. \tag{13}$$

Equation 13 above shows that the current density maximum in the coupler segment or device, $J_{max}$, will be a maximum at the inner radius, $r=r_0$, $$J_{\max} = \frac{h_1}{h_c}\frac{w_0}{r_0}\frac{1}{\ln(r_1/r_0)}J_0. \tag{14}$$

In order to avoid excessive temperature locations, hot spots, the magnitude of $J_{max}$ may be reduced or limited by selecting appropriate values for the geometrical factor ratios in Equation 14, i.e. $h_1/h_C$, $w_0/r_0$ and $r_1/r_0$.

Figure 13:
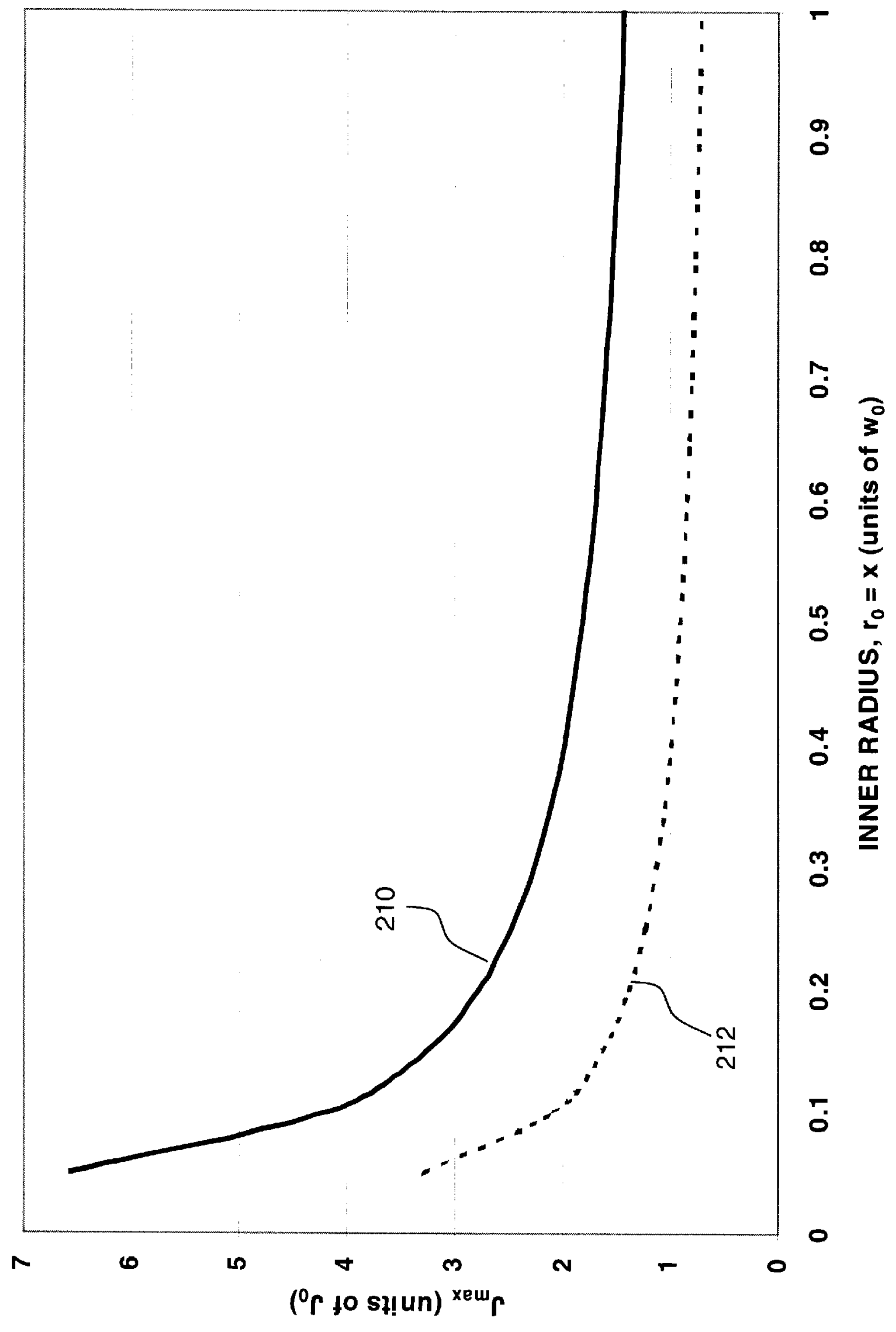
FIG. 13 is a plot of the current densities at the inner radius of current coupler segments having an arcuate portion for two layer thickness ratios.

FIG. 13 illustrates the dependence of $J_{max}$ plotted from Equation 14 for some representative geometries having the overall shape of the first and second resistor segments 62, 64 and coupler segment 66 shown in FIG. 12. The overall shape is characterized by $w_1=w_2=w_0$ and $r_1=r_0+w_0$. For the plots 210 and 212 of FIG. 13, $r_0$ is expressed in units of $w_0$, i. e., $r_0=xw_0$, where x=0.2 to 1.0. For plot 210, the ratio of layer thickness is 1.0, i.e., $h_1=h_C$. For plot 212 the coupler thickness is twice the first layer nominal thickness, i.e., $h_C=2h_1$. Hence, following expression for $J_{max}$ (x) is plotted for the two layer thickness ratios in FIG. 13:

$$J_{\max} = \frac{h_1}{h_c}\frac{1}{x\ln((1+x)/x)}J_0. \tag{15}$$

It may be understood from plot 210 of FIG. 13, wherein the coupling segment 66 has the same thickness as the nominal thickness of the first and second resistor segments 62, 64, that the maximum coupler current density, $J_{max}$, will be more than twice the nominal current density, $J_0$, if the inner radius $r_0$ is less than approximately one-half the nominal width $w_0$ of the first and second resistor segments. If the thickness of the coupler segment is doubled over the nominal thickness, as for plot 212 of FIG. 13, then the inner radius may be as small as one-tenth the nominal width before the current density maximum exceeds twice the nominal current density.

The temperature rise of a resistor volume which receives an input of electrical energy was shown in Equation 6 to be proportional to the square of the current density and in Equation 8 to be proportional to the power density. The square of the current density and the power density differ by the conductivity of the resistor volume material, as noted by Equation 7. The power density maximum in the coupler device or segment, $PD_{max}$, and the temperature rise maximum in the coupler device or segment, $\Delta T_{max}$, for the representative geometries used to arrive at Equation 15 and the plots 210 and 212 of FIG. 13, are found by inserting the expression for the coupler maximum current density, Equation 15 into the above Equations 6–8. Thus, $$PD_{\max} = \frac{\sigma_0}{\sigma_c}\left(\frac{h_1}{h_c}\right)^2 \frac{1}{(x\ln((1+x)/x))^2}PD_0; \tag{16}$$

$$\Delta T_{\max} = \frac{\rho_0}{\rho_c}\frac{c_0}{c_c}\frac{\sigma_0}{\sigma_c}\left(\frac{h_1}{h_c}\right)^2 \frac{1}{(x\ln((1+x)/x))^2}\Delta T_0 \tag{17}$$

where $PD_0$ is the nominal power density and $\Delta T_0$ is the nominal temperature rise in the first and second resistor segments 62, 64 of FIG. 12*c*. $p_0$, $c_0$, $P_C$, and $c_C$ are the mass density and heat capacity for the electrically resistive material used for first and second resistor segments 62, 64 and the electrically active material used for the coupler segment 66 or device 68, respectively. The geometrical factor contribution of the partial annulus shape of the coupler device or segment is carried in Equation 17 by the terms which depend on x, wherein, as above, $r_0=xw_0$ and $r_1=r_0+w_0$.

Figure 14:
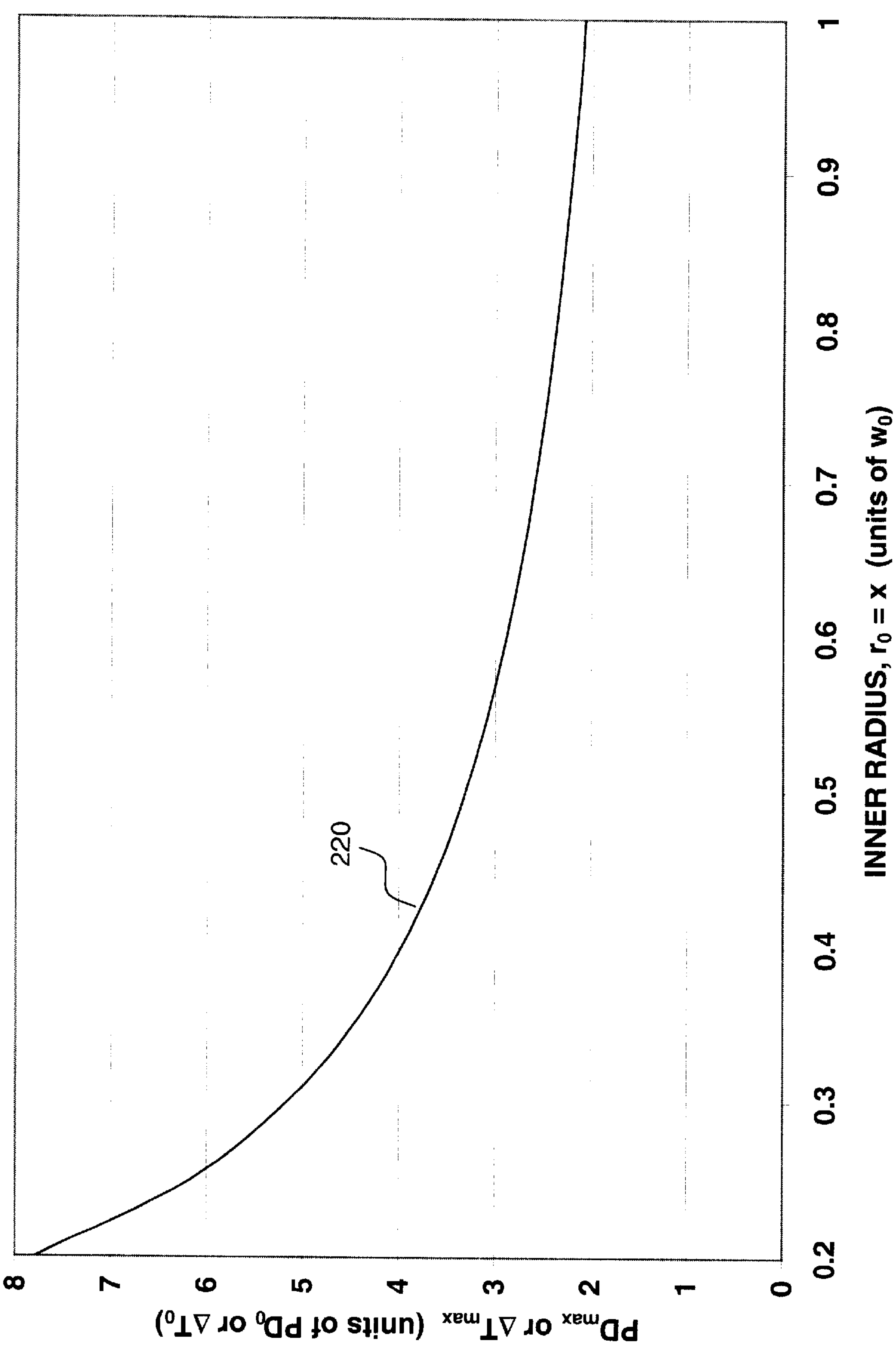
FIG. 14 is a plot of the power density maximum and temperature rise maximum at the inner radius of a current coupler segment having an arcuate portion.

The shape factor contribution to the power density maximum, $PD_{max}$, and temperature rise maximum, $DT_{max}$, is illustrated by plot 220 in FIG. 14. That is, plot 220 in FIG. 14 is done for a case where the materials properties and layer thickness are equal so that the ratio terms in Equations 16 and 17 equal 1.0. Either the power density maximum or the temperature rise maximum in the coupler segment may be read from the ordinate of plot 220 in normalized units. Plot 220 in FIG. 14 represents some preferred embodiments of the present inventions wherein current coupling is provided by forming a coupler segment in the electrically resistive material of first layer 22. The coupler segment materials properties and thickness are nominally the same as those same parameters of the first and second resistor segments.

Figure 15:
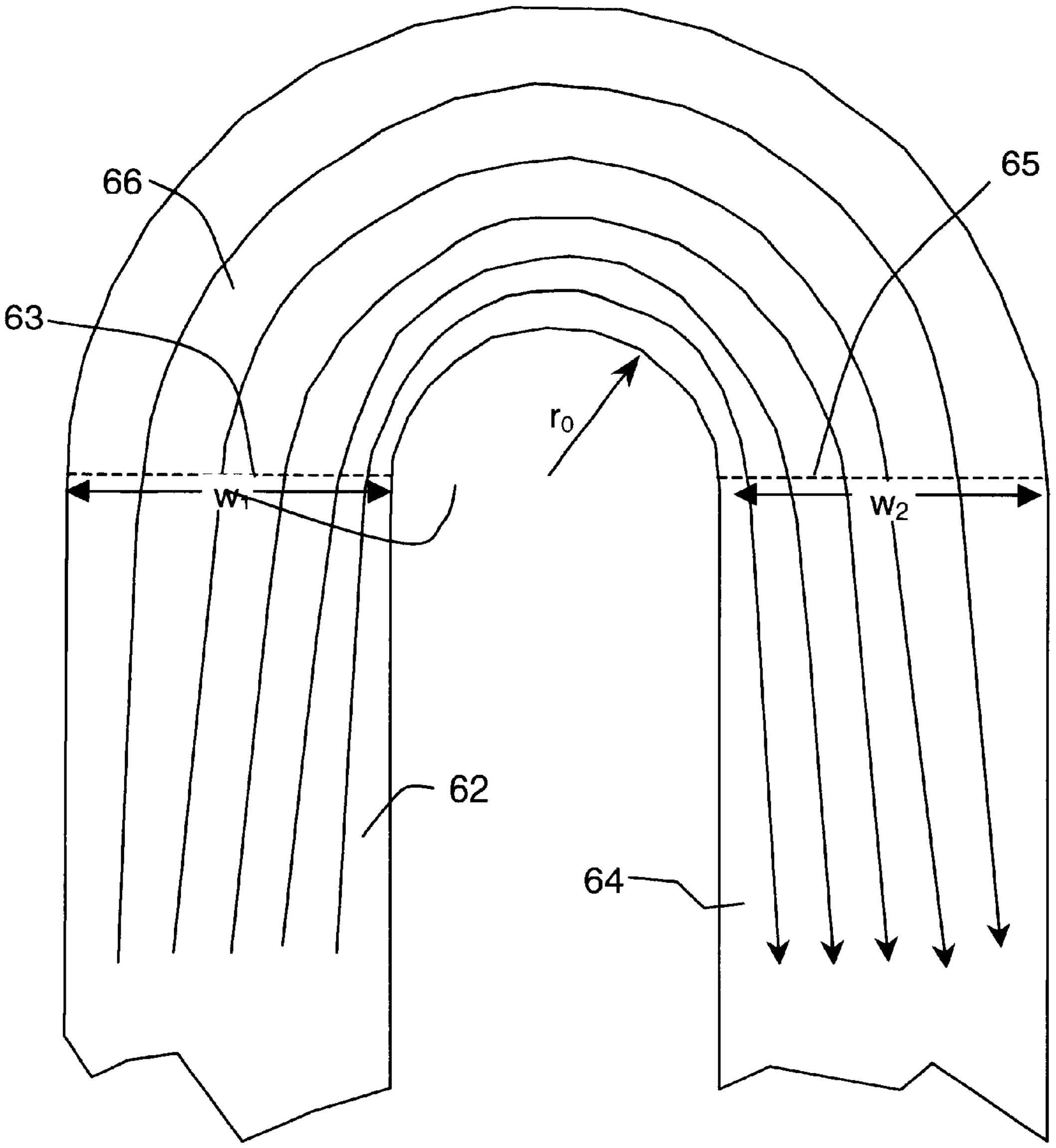
FIG. 15 is a plan view of a coupler segment according to a preferred embodiment of the present inventions.

Plot 220 of FIG. 14 indicates that the coupler temperature rise maximum, or the coupler power density maximum, located at the inner radius of the arcuate shape of the coupler segment, will be more than four times the nominal values which occur elsewhere on the cantilevered element if the inner radius is less that 0.4 times the nominal first and second resistor widths, $w_0$. FIG. 15 illustrates a coupler segment 66 which has been designed to have an inner radius $r_0$ which is approximately one-half the width of the first or second resistor segments, 62 or 64. Such a design would limit the temperature rise maximum, the hottest spot temperature, to approximately 3.3 $\Delta T_0$.

A difficulty with employing a large value for the inner radius of the current coupler segment is elimination of first layer material. In cantilevered element thermal actuators of the present inventions, the overall width of first layer material contributes importantly to the magnitude of the thermal-mechanical force that can be generated when the actuator deflects. The thermal expansion of the first layer provides the basic mechanical force available in the actuator. For a given cantilever length, the wider the expanding first layer material, the greater the net force.

Figure 16:
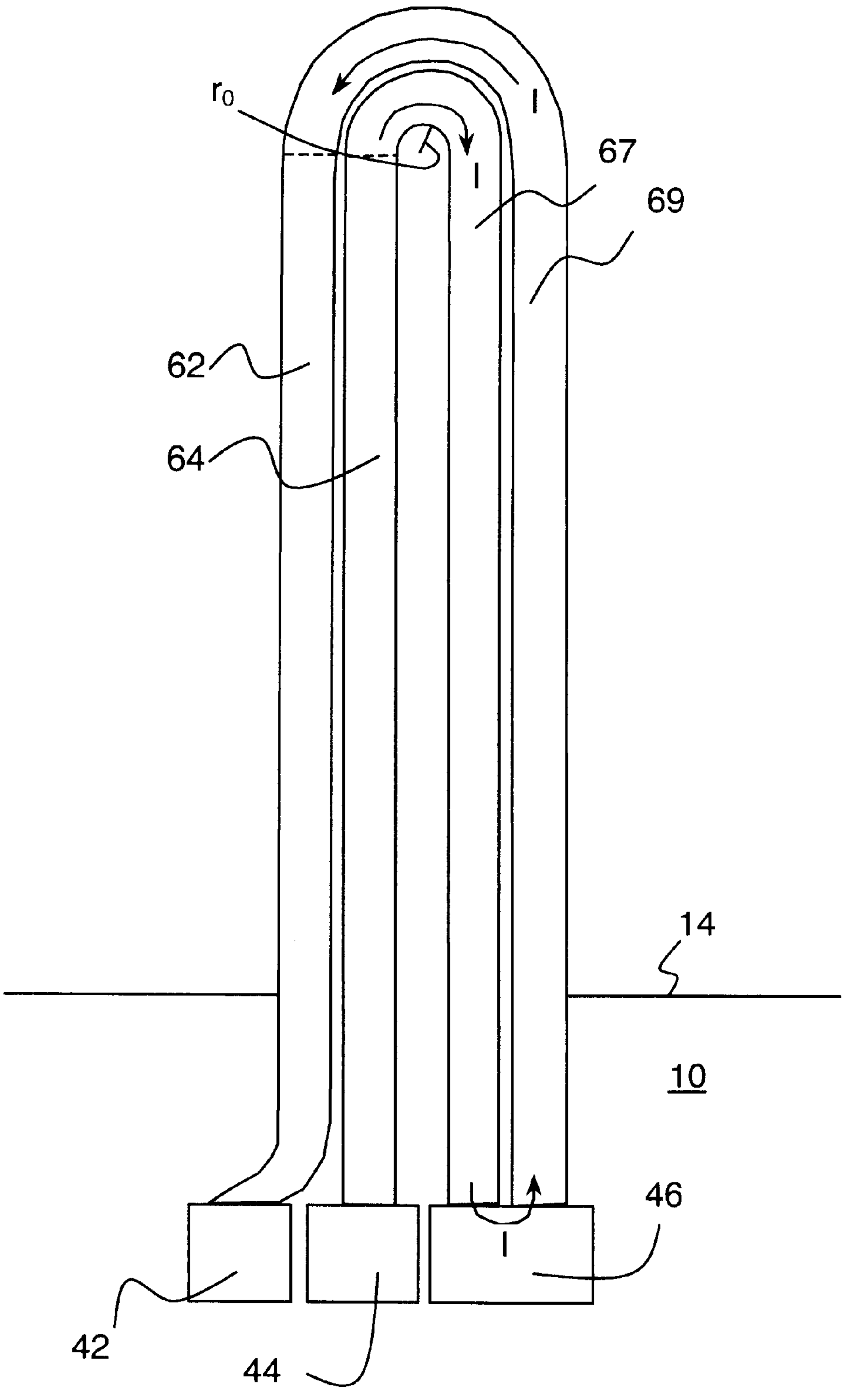
FIG. 16 is a plan view of an alternate design utilizing a coupler segment according to a preferred embodiment of the present inventions.

FIG. 16 illustrates an alternate design for a resistor and coupler configuration for a cantilevered element in which two loops of current are employed. A voltage pulse is applied across first electrode 42 and second electrode 44 connected to first resistor segment 62 and second resistor segment 64, respectively. The other two legs of the double loop, third and fourth segments 67 and 69 are coupled off the cantilever by a common electrode 46. The cantilevered element extends from base element 10 at anchor edge 14. While a hot spot could possibly be created at common electrode 46 located off the cantilevered element, it is straightforward to arrange that it not be adjacent the working liquid of a drop emitter or other liquid handling device. Conceptually, for the purpose of understanding the present inventions, segments 67 and 69 together may be considered to be a coupling segment wherein the location of highest current density is at the inner radius of segment 67, the smallest inner radius.

The two-loop design illustrated in FIG. 16 allows the inner radius $r_0$ to be a substantial fraction of the widths of the first and second resistor segments 62 and 64 without eliminating as much first layer material. The overall resistance of the circuit will be approximately doubled, necessitating a larger voltage pulse to introduce a nominal value, $PD_0$, of the power density which is equivalent to a single loop arrangement. For the purposes of the present inventions, a resistor configuration having multiple loops may be similarly analyzed with the resistance segments which are attached to the input voltage terminals considered the first and second resistor segments, and the resistor segments in-between as forming a current coupling device.

Figure 17A:
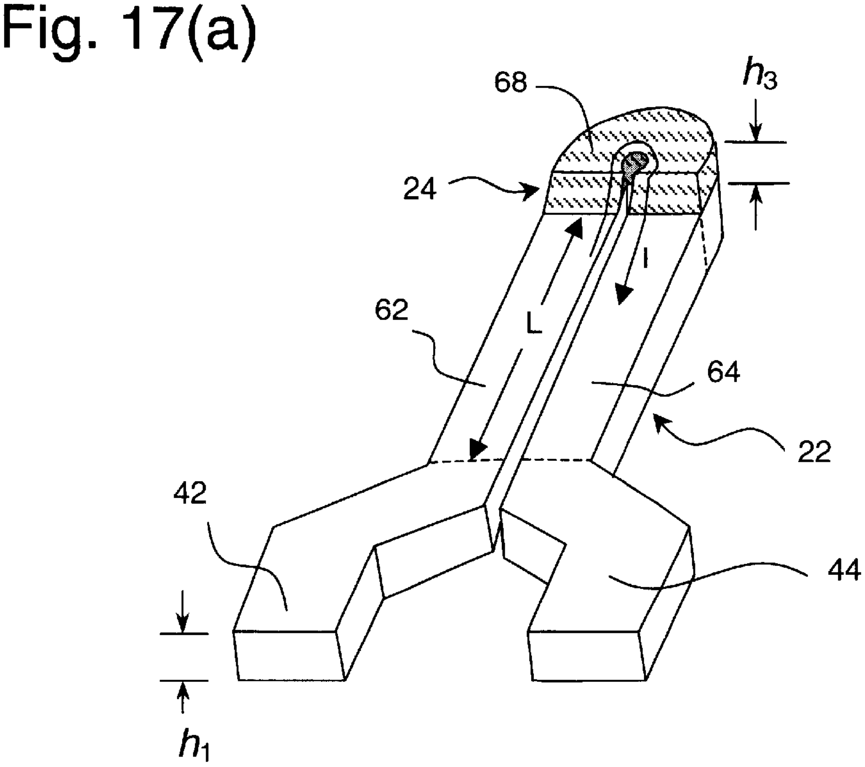
FIGS. 17 (*a*) and 17 (*b*) is a perspective and plan view of a coupler device according to a preferred embodiment of the present inventions.
Figure 17B:
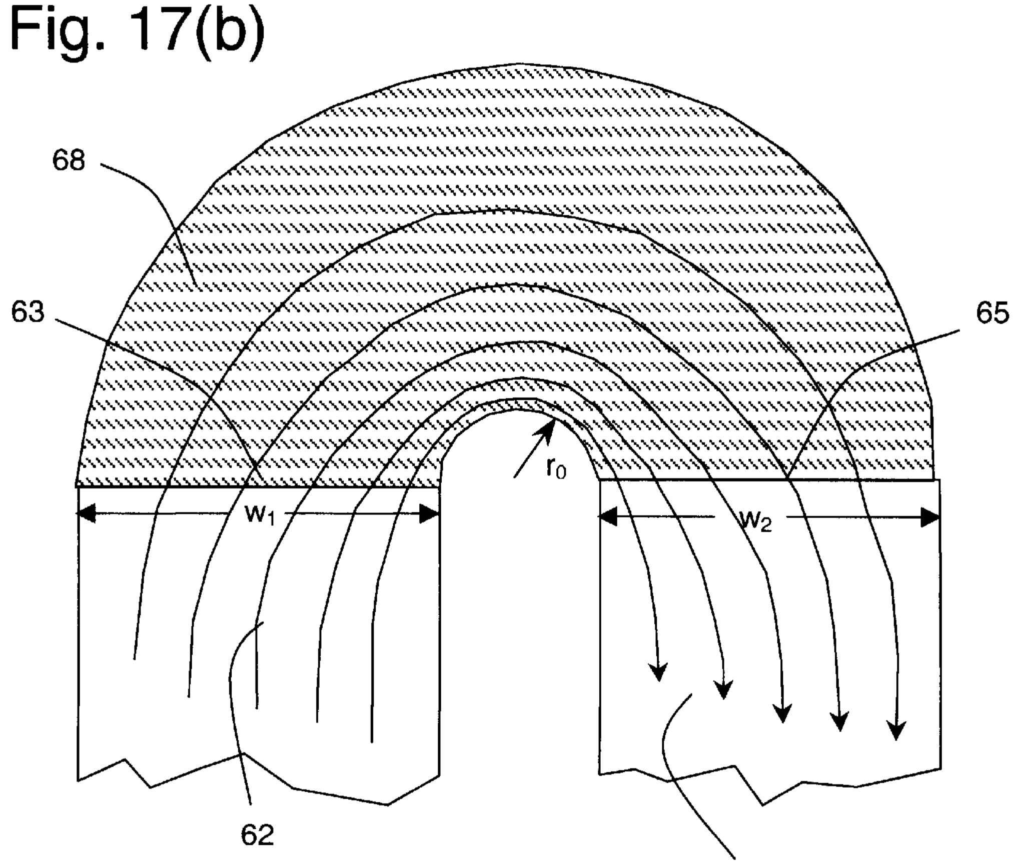

FIG. 17 illustrates in perspective and enlarged plan views the use of a coupler device 68 according to the present inventions. A third layer 24 of an electrically active material, indicated by shading in FIG. 17, is added and patterned to form coupling device 68. The addition of a third layer 24 allows the power density maximum to be reduced via the conductivity ratio $\sigma_0/\sigma_C$, the square of the thickness ratio, $(h_1/h_C)^2$, and, to smaller practical extent, the heat capacity and mass density ratios, as captured in Equation 16. The same electrically resistive material used to form the first layer may be used to form third layer 24 and coupling device 68, in which case the materials properties ratios will be 1.0, but the thickness ratio will be favorably impacted. Adding 41% more thickness to the electrically resistive material layer thickness in the coupler segment will reduce the power density maximum and the temperature rise maximum by a factor of 2, for the same value inner radius, $r_0$. Alternatively, if the electrically active material added to form the third layer 24 has a substantially higher conductivity than the electrically resistive material used for the first layer, the power density maximum may be reduced significantly while using yet smaller values of the inner radius.

It may be seen from Equations 16 and 17 and plot 220 of FIG. 14 that there are many combinations of the parameters that will manage the power density maximum and temperature rise maximum of the hottest spot on a current coupler device or segment located on the cantilevered element.

The analysis herein is applicable to a more general case wherein a coupling device has a different shape than those of FIGS. 12, 15–17. Excessive temperature rise locations may occur in a heating resistor configuration wherever current must change directions. Such locations will have a smallest path length which may be considered the smallest inner radius of an arcuate portion of the current coupler device. The width of the resistor in the straight portion immediately preceding the arcuate portion, the current entry width, may be used to normalize or "scale" the inner radius as was done to arrive at Equation 15 above. For resistor configurations with multiple areas of current direction change, the hottest spot will likely be the location where the normalized inner radius of a current path is the smallest. Application of more highly conducting material at these locations will reduce the power density. Equations 16 and 17 above are useful to compare the potential for hot spots in a thin film heater configuration given a situation wherein there are different materials, thicknesses, entry widths, and inner radii at various locations.

The inventors of the present inventions have found that cantilevered element thermal actuators, working in contact with a liquid, may cause the generation of vapor bubbles, which first appear at the locations of highest power density within the heater resistor configuration. Such bubble formation is highly undesirable for the predictable and reliable performance of the device. It is not believed practical to operate a thermo-mechanical actuator device in a liquid for acceptable numbers of cycles if accompanied by vapor bubble generation at hot spots. Therefore the ratio of power density between the location of the power density maximum and the nominal power density in the main portions of the actuation resistors becomes an important limitation on the operating latitude of such devices. If, for example, the hot spot power density were 10 times higher than the nominal power density, then the device could be operated reliably using a nominal temperature rise of less than one-tenth the temperature at which vapor bubbles are nucleated.

For a variety of practical considerations, including liquid chemical safety, temperature limits of organic material components used in working liquids and in device fabrication, upper temperature limits for hot spots are likely to be in the range of 300° C. to 400° C. Water is the most common solvent in working liquids used with MEMS devices, primarily because of environmental safety ease-of-use. Many large organic molecules, such as dyes used for ink jet printing, will decompose at temperatures above 300° C. Most organic materials used as adhesives or protective coatings will decompose at temperatures above 400° C.

On the other hand, the deflection force that may be generated by a practically constructed cantilevered element thermal actuator is directly related to the amount of pulsed temperature rise that can be utilized. This temperature increase is directly related to the nominal power density that is applied to the actuation resistors, first and second resistor segments 62 and 64 in FIG. 17, for example. Typically, 50° C. of temperature rise would be a minimum level to provide a useful amount of mechanical actuation in a MEMS-based thermal actuator. More preferably, 100° C.–150° C. of pulsed temperature increase is desirable for thermal actuators used in liquid drop emitters such as ink jet printheads.

The above boundaries of a minimum nominal power density for acceptable mechanical performance and a maximum power density which avoids vapor bubble formation leads to a preferred design for the heater resistor configuration for a cantilevered element thermal actuator. The inventors of the present inventions have found that a preferred design is one in which the coupler power density maximum, occurring at the smallest inner radius of arcuate portions of current coupler devices, is no more than four times the nominal power density occurring in the main heater resistor segments. For cases where the current coupler device is a coupler segment of the same electrically resistive layer used to form the main heater resistor segments, a preferred design limits the coupler current density at hot spot locations to twice the nominal current density. These limitations on the current density maximum and power density maximum may be achieved by a large variety of combinations of materials, thickness, and geometry factors as has been explained herein.

The inventors of the present inventions have further found that liquid drop emitters of the present inventions may be optimally operated by first determining, experimentally, the input pulse power and energy conditions that cause the onset of vapor bubble formation (nucleation) for each desired working liquid. Then, during normal operation, the input pulse power and energy are constrained to be at least 10% smaller than the determined bubble nucleation values. Vapor bubble nucleation may be directly observed in test devices which have identical cantilevered element and liquid chamber characteristics but are fitted for optical observation of known hot spot areas of the cantilevered element. Vapor bubble nucleation and collapse may also be detected acoustically.

While much of the foregoing description was directed to the configuration and operation of a single thermal actuator or drop emitter, it should be understood that the present invention is applicable to forming arrays and assemblies of multiple thermal actuators and drop emitter units. Also it should be understood that thermal actuator devices according to the present invention may be fabricated concurrently with other electronic components and circuits, or formed on the same substrate before or after the fabrication of electronic components and circuits.

From the foregoing, it will be seen that this invention is one well adapted to obtain all of the ends and objects. The foregoing description of preferred embodiments of the invention has been presented for purposes of illustration and description. It is not intended to be exhaustive or to limit the invention to the precise form disclosed. Modification and variations are possible and will be recognized by one skilled in the art in light of the above teachings. Such additional embodiments fall within the spirit and scope of the appended claims.

PARTS LIST

10 substrate base element
12 liquid chamber
13 gap between cantilevered element and chamber wall
14 cantilevered element anchor location
15 thermal actuator
16 liquid chamber curved wall portion
20 cantilevered element
21 passivation layer
22 first layer
23 second layer
24 third layer
25 heater resistor
26 cantilevered element anchor end portion
27 cantilevered element free end portion
28 liquid chamber structure, walls and cover
29 passivation layer
30 nozzle
41 TAB lead
42 electrical input pad
43 solder bump
44 electrical input pad
46 common electrode
50 drop
52 vapor bubbles
60 working liquid
62 first resistor segment
63 first joining location
64 second resistor segment
65 second joining location
66 coupling segment
67 resistor segment in a multiple loop configuration
68 coupling device
69 resistor segment in a multiple loop configuration
80 support structure
100 ink jet printhead
110 drop emitter unit
200 electrical pulse source
300 controller
400 image data source
500 receiver

What is claimed is:

1. A thermal actuator for a micro-electromechanical device comprising:

(a) abase element;

(b) a cantilevered element extending from the base element and residing at a first position, the cantilevered element including a first layer constructed of an electrically resistive material patterned to have a first resistor segment and a second resistor segment each extending from the base element, a coupling device that conducts electrical current serially between the first and second resistor segments, and a second layer constructed of a dielectric material having a low coefficient of thermal expansion and attached to the first layer; and (c) a first electrode connected to the first resistor segment and a second electrode connected to the second resistor segment to apply an electrical voltage pulse between the first and second electrodes thereby causing an activation power density in the first and second resistor segments and a power density maximum within the coupling device resulting in a deflection of the cantilevered element to a second position and wherein the power density maximum is less than four times the activation power density.

2. The thermal actuator of claim 1 wherein the electrically resistive material is titanium aluminide.

3. The thermal actuator of claim 1 wherein the first layer constructed of an electrically resistive material has a nominal sheet resistance and the coupling device is formed from a third layer of an electrically active material, said third layer having a coupler sheet resistance of less than one-half of the nominal sheet resistance.

4. The thermal actuator of claim 3 wherein the electrically active material is a good conductor.

5. The thermal actuator of claim 4 wherein the electrically active material is aluminum.

6. The thermal actuator of claim 4 wherein the first resistor segment has a first width at a first joining location with the coupling device, the second resistor segment has a second width at a second joining location with the coupling device, and the coupling device includes an arcuate portion having a smallest inner radius which is larger than one-tenth times the smaller of the first width and second width.

7. A thermal actuator for a micro-electromechanical device comprising:

(a) a base element;

(b) a cantilevered element extending from the base element and residing at a first position, the cantilevered element including a first layer constructed of an electrically resistive material, a first resistor segment and a second resistor segment each extending from the base element and patterned in the electrically resistive material, a coupling segment that conducts current serially between the first and second resistor segments patterned in the electrically resistive material, and a second layer constructed of a dielectric material having a low coefficient of thermal expansion and attached to the first layer; and (c) a first electrode connected to the first resistor segment and a second electrode connected to the second resistor segment to apply an electrical voltage pulse between the first and second electrodes thereby causing an activation power density in the first and second resistor segments and a power density maximum within the coupling device resulting in a deflection of the cantilevered element to a second position and wherein the power density maximum is less than four times the activation power density.

8. The thermal actuator of claim 7 wherein the electrically resistive material is titanium aluminide.

9. The thermal actuator of claim 7 wherein the second layer is formed over the first layer covering the first resistor segment, the second resistor segment and the coupling segment.

10. The thermal actuator of claim 7 wherein an electrical voltage pulse causes an activation current density in the first and second resistor segments and a current density maximum within the coupling device and wherein the current density maximum is less than two times the activation current density.

11. The thermal actuator of claim 10 wherein the first resistor segment has a first width at a first joining location with the coupling segment, the second resistor segment has a second width at a second joining location with the coupling segment, and the coupling segment includes an arcuate portion having a smallest inner radius which is larger than one half times the smaller of the first width and second width.

12. The thermal actuator of claim 7 wherein the electrically resistive material in the first layer has a nominal thickness in a resistor portion of the first layer where the first and second resistor segments are patterned and a coupler thickness in an adjacent portion of the first layer where the coupling segment is formed, said coupling thickness being at least two times said nominal thickness.

13. The thermal actuator of claim 7 wherein the electrically resistive material in the first layer has a nominal conductivity in a resistor portion of the first layer where the first and second resistor segments are patterned and a substantially higher coupler conductivity in an adjacent portion of the first layer where the coupling segment is formed, said substantially higher coupling conductivity being the result of a localized modification of the electrically resistive material in the adjacent portion.

14. A liquid drop emitter comprising:

(a) a chamber, formed in a substrate, filled with a liquid and having a nozzle for emitting drops of the liquid;

(b) a thermal actuator having a cantilevered element extending a from a wall of the chamber and a free end residing in a first position proximate to the nozzle, the cantilevered element including a first layer constructed of an electrically resistive material patterned to have a first resistor segment and a second resistor segment each extending from the wall, a coupling device that conducts current serially between the first and second resistor segments, and a second layer constructed of a dielectric material having a low coefficient of thermal expansion and attached to the first layer; and (c) a first electrode connected to the first resistor segment and a second electrode connected to the second resistor segment to apply an electrical voltage pulse between the first and second electrodes thereby causing an activation power density within the first and second resistor segments and a power density maximum within the coupling device, resulting in rapid deflection of the cantilevered element and ejection of a liquid drop, wherein the power density maximum is less than four times the activation power density.

15. The liquid drop emitter of claim 14 wherein the electrically resistive material is titanium aluminide.

16. The liquid drop emitter of claim 14 wherein the first layer constructed of an electrically resistive material has a nominal sheet resistance and the coupling device is formed from a third layer of an electrically active material, said third layer having a coupler sheet resistance of less than one-half of the nominal sheet resistance.

17. The liquid drop emitter of claim 14 wherein the electrically active material is a good conductor.

18. The liquid drop emitter of claim 14 wherein the electrically active material is aluminum.

19. The liquid drop emitter of claim 14 wherein the first resistor segment has a first width at a first joining location with the coupling device, the second resistor segment has a second width at a second joining location with the coupling device, and the coupling device includes an arcuate portion having a smallest inner radius which is larger than one-tenth times the smaller of the first width and second width.

20. A liquid drop emitter for a micro-electromechanical device comprising:

(a) a chamber, formed in a substrate, filled with a liquid and having a nozzle for emitting drops of the liquid;

(b) a thermal actuator having a cantilevered element extending a from a wall of the chamber and a free end residing in a first position proximate to the nozzle, the cantilevered element including a first layer constructed of an electrically resistive material patterned to have a first resistor segment and a second resistor segment each extending from the wall, a coupling segment that conducts current serially between the first and second resistor segments patterned in the electrically resistive material, and a second layer constructed of a dielectric material having a low coefficient of thermal expansion and attached to the first layer; and (c) a first electrode connected to the first resistor segment and a second electrode connected to the second resistor segment to apply an electrical voltage pulse between the first and second electrodes thereby causing an activation power density within the first and second resistor segments and a power density maximum within the coupling device, resulting in rapid deflection of the cantilevered element and ejection of a liquid drop, wherein the power density maximum is less than four times the activation power density.

21. The liquid drop emitter of claim 20 wherein the electrically resistive material is titanium aluminide.

22. The liquid drop emitter of claim 20 wherein the second layer is formed over the first layer covering the first resistor segment, the second resistor segment and the coupling segment.

23. The liquid drop emitter of claim 20 wherein an electrical voltage pulse causes an activation current density in the first and second resistor segments and a current density maximum within the coupling segment and wherein the current density maximum is less than two times the activation current density.

24. The liquid drop emitter of claim 23 wherein the first resistor segment has a first width at a first joining location with the coupling segment, the second resistor segment has a second width at a second joining location with the coupling segment, and the coupling segment includes an arcuate portion having a smallest inner radius which is larger than one half times the smaller of the first width and second width.

25. The liquid drop emitter of claim 20 wherein the electrically resistive material in the first layer has a nominal thickness in a resistor portion of the first layer where the firs and second resistor segments are patterned and a coupler thickness in an adjacent portion of the first layer where the coupling segment is formed, said coupler thickness being at least two times said nominal thickness.

26. The liquid drop emitter of claim 20 wherein the electrically resistive material in the first layer has a nominal conductivity in a resistor portion of the first layer where the first and second resistor segments are patterned and a substantially higher coupler conductivity in an adjacent portion of the first layer where the coupling segment is formed, said substantially higher coupling conductivity being the result of a localized modification of the electrically resistive material in the adjacent portion.

* * * * *